United States Patent
Kida et al.

(10) Patent No.: US 10,216,306 B2
(45) Date of Patent: Feb. 26, 2019

(54) TOUCH PANEL-EQUIPPED DISPLAY DEVICE

(71) Applicant: SHARP KABUSHIKI KAISHA, Sakai, Osaka (JP)

(72) Inventors: Kazutoshi Kida, Sakai (JP); Kenshi Tada, Sakai (JP); Takenori Maruyama, Sakai (JP); Hideki Shioe, Sakai (JP); Yutaka Ishida, Sakai (JP); Takashi Saitoh, Sakai (JP); Kazuyoshi Maeda, Sakai (JP); Hideo Hosorogi, Sakai (JP); Kohji Michibayashi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/741,727

(22) PCT Filed: Jul. 6, 2016

(86) PCT No.: PCT/JP2016/069971
§ 371 (c)(1),
(2) Date: Jan. 3, 2018

(87) PCT Pub. No.: WO2017/006954
PCT Pub. Date: Jan. 12, 2017

(65) Prior Publication Data
US 2018/0196562 A1    Jul. 12, 2018

(30) Foreign Application Priority Data
Jul. 9, 2015 (JP) .................. 2015-137518

(51) Int. Cl.
*G06F 3/041* (2006.01)

(52) U.S. Cl.
CPC ............ *G06F 3/0412* (2013.01); *G06F 3/041* (2013.01)

(58) Field of Classification Search
CPC ....... G06F 3/0412; G06F 3/0416; G06F 3/044
See application file for complete search history.

(56) References Cited

U.S. PATENT DOCUMENTS 9,778,725 B2 * 10/2017 Kuroiwa ............... G06F 1/3215
2013/0093722 A1   4/2013 Noguchi et al.
(Continued)

FOREIGN PATENT DOCUMENTS

JP    2013-084168 A    5/2013

*Primary Examiner* — Gerald Johnson
(74) *Attorney, Agent, or Firm* — ScienBiziP, P.C.

(57) ABSTRACT

A touch panel-equipped display device includes at least: a display control unit to supply a scan signal and a data signal to a display control element; and a touch position detection control unit to supply a drive signal to a drive electrode, and to detect a position detection signal from a detection electrode to detect a touch position. The display control unit supplies the data signal sequentially to a plurality of display control elements connected respectively to a plurality of pixel electrodes constituting one display pixel. The touch position detection control unit starts supplying the drive signal, in a period that is within a scan write period during which the scan signal is supplied to the display control element and is other than a period during which the data signal is supplied to the display control element corresponding to a color highest in luminosity of a plurality of colors.

6 Claims, 18 Drawing Sheets

(56) References Cited

U.S. PATENT DOCUMENTS

| | | | |
|---|---|---|---|
| 2015/0061539 A1* | 3/2015 | Hirayama | H05B 37/0272 315/292 |
| 2015/0253934 A1* | 9/2015 | Lin | G06F 3/0428 345/175 |
| 2015/0317932 A1* | 11/2015 | Zhou | G09G 3/32 345/173 |
| 2015/0325171 A1* | 11/2015 | Zhou | G09G 3/3233 345/80 |

* cited by examiner

TOUCH PANEL-EQUIPPED DISPLAY DEVICE

TECHNICAL FIELD

The present invention relates to a touch panel-equipped display device.

BACKGROUND ART

Patent Literature (PTL) 1 describes a display device including: a display control element; a touch detection element; and a drive unit for driving the display control element to sequentially display M horizontal lines in each of a plurality of unit drive periods constituting one frame period, and driving the touch detection element in N touch position detection periods provided in the unit drive period, where N is smaller than M. This display device performs display driving for the M horizontal lines sequentially in each unit drive period, and drives the touch detection element in the N touch detection periods in the unit drive period.

CITATION LIST

Patent Literature

PTL 1: JP 2013-84168 A

DISCLOSURE OF THE INVENTION

In the display device described in PTL 1, a signal for touch position detection is input to a drive electrode to which a signal for display is input. Accordingly, touch position detection is performed in a touch position detection period different from a display control period in the unit drive period. This decreases the degree of freedom of touch position detection timing.

If touch position detection is performed in the display control period, however, the supply of the drive signal to the drive electrode can cause an influence on the display screen.

An object of the present invention is to provide a touch panel-equipped display device that suppresses an influence on a display screen caused by supplying a drive signal to a drive electrode for touch position detection.

A touch panel-equipped display device according to an aspect of the present invention includes: a pixel electrode; a display control element connected to the pixel electrode; a common electrode that forms a capacitance with the pixel electrode; a drive electrode; a detection electrode that forms a capacitance with the drive electrode; a display control unit configured to supply a scan signal and a data signal to the display control element to perform display control; and a touch position detection control unit configured to supply a drive signal to the drive electrode, and to detect a position detection signal output from the detection electrode to detect a touch position, wherein the display control element and the pixel electrode are arranged to correspond to any one of a plurality of colors for performing color display, the display control unit, when supplying the data signal to the display control element, supplies the data signal sequentially to a plurality of display control elements connected respectively to a plurality of pixel electrodes constituting one display pixel, and the touch position detection control unit starts the supply of the drive signal to the drive electrode, in a period that is within a scan write period during which the scan signal is supplied to the display control element and is other than a period during which the data signal is supplied to the display control element corresponding to a color highest in luminosity of the plurality of colors.

According to the present disclosure, the supply of the drive signal to the drive electrode is started in the period that is within the scan write period during which the scan signal is supplied to the display control element and is other than the period during which the data signal is supplied to the display control element corresponding to the color highest in luminosity. Thus, an influence on the display screen when starting the supply of the drive signal to the drive electrode for touch position detection can be suppressed.

EMBODIMENTS FOR CARRYING OUT THE INVENTION

Figure 1:
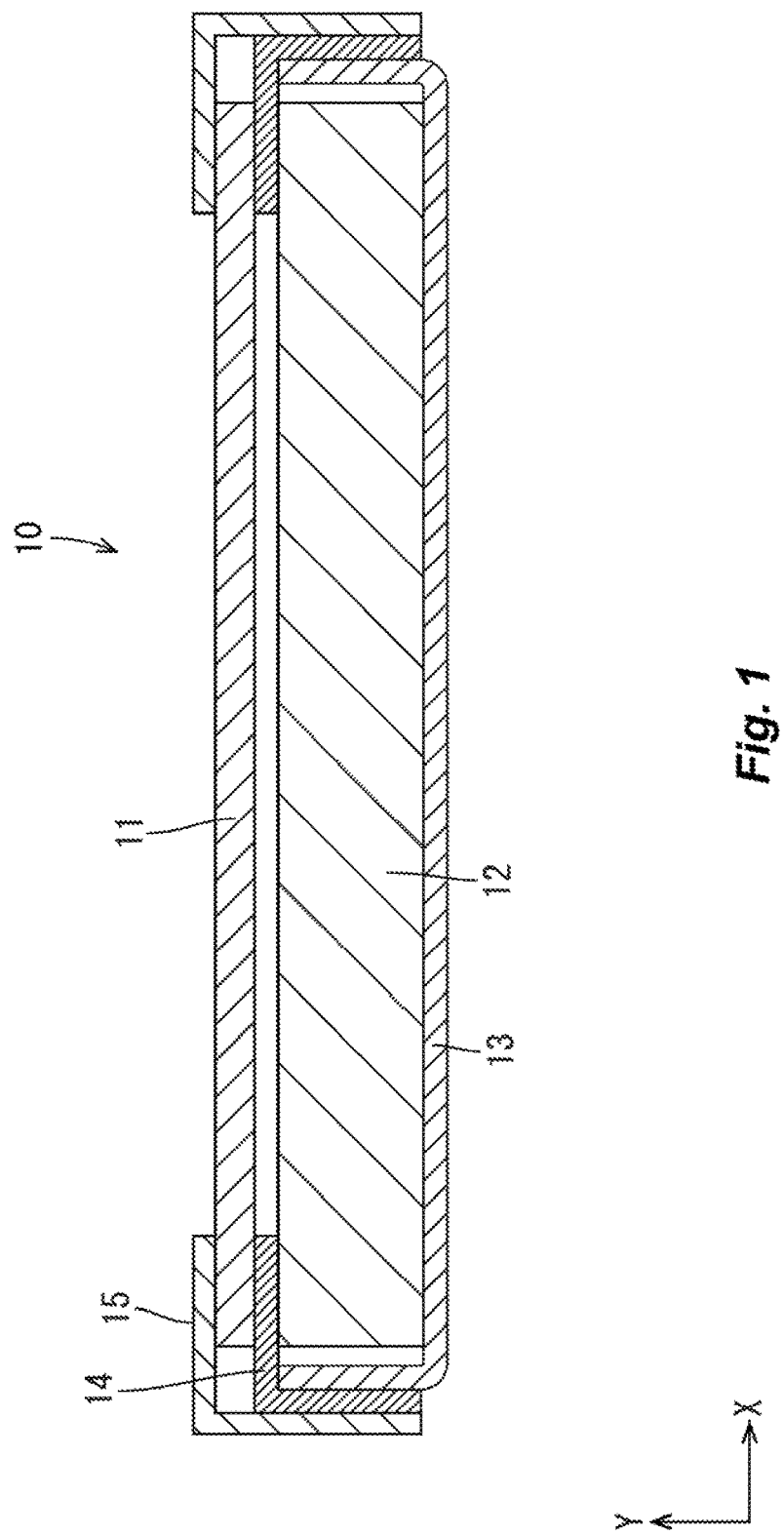
FIG. 1 is a sectional view of a touch panel-equipped display device in a first embodiment.

A touch panel-equipped display device according to an aspect of the present invention includes: a pixel electrode; a display control element connected to the pixel electrode; a common electrode that forms a capacitance with the pixel electrode; a drive electrode; a detection electrode that forms a capacitance with the drive electrode; a display control unit configured to supply a scan signal and a data signal to the display control element to perform display control; and a touch position detection control unit configured to supply a drive signal to the drive electrode, and to detect a position detection signal output from the detection electrode to detect a touch position, wherein the display control element and the pixel electrode correspond to any one of a plurality of colors for performing color display, the display control unit, when supplying the data signal to the display control element, supplies the data signal sequentially to a plurality of display control elements connected respectively to a plurality of pixel electrodes constituting one display pixel, and the touch position detection control unit starts the supply of the drive signal to the drive electrode, in a period that is within a scan write period during which the scan signal is supplied to the display control element and is other than a period during which the data signal is supplied to the display control element corresponding to a color highest in luminosity of the plurality of colors (first structure).

With the first structure, the supply of the drive signal to the drive electrode is started in the period that is within the scan write period and is other than the period during which the data signal is supplied to the display control element corresponding to the color highest in luminosity. Thus, an influence on image display when supplying the drive signal to the drive electrode for touch position detection can be suppressed.

In the first structure, the touch position detection control unit may start the supply of the drive signal to the drive electrode, in a period between when the supply of the data signal to the display control element to which the data signal is supplied immediately before the supply of the data signal to the display control element corresponding to a color lowest in luminosity of the plurality of colors ends and when the supply of the data signal to the display control element corresponding to the color lowest in luminosity starts (second structure).

With the second structure, an influence on image display can be reduced as compared with the case where the supply of the drive signal to the drive electrode is started during the supply of the data signal to the display control element. Moreover, the color influenced most by starting the supply of the drive signal to the drive electrode is the color lowest in luminosity, so that an influence on image display caused by the supply of the drive signal to the drive electrode can be suppressed.

In the second structure, the display control element to which the data signal is supplied immediately before the supply of the data signal to the display control element corresponding to the color lowest in luminosity may correspond to the color highest in luminosity (third structure).

With the third structure, the supply of the drive signal to the drive electrode is started after the supply of the data signal to the display control element corresponding to the color highest in luminosity ends, and therefore the color highest in luminosity can be prevented from changing in luminance level. Hence, an influence on image display caused by the supply of the drive signal to the drive electrode can be effectively suppressed.

In the first structure, the touch position detection control unit may start the supply of the drive signal to the drive electrode, in a period during which the data signal is supplied to the display control element corresponding to a color lowest in luminosity of the plurality of colors (fourth structure).

With the fourth structure, the color influenced most by the supply of the drive signal to the drive electrode is the color lowest in luminosity, so that an influence on image display caused by the supply of the drive signal to the drive electrode can be suppressed.

In the fourth structure, the period during which the data signal is supplied to the display control element corresponding to the color lowest in luminosity may be longest of respective periods for supplying the data signal to the plurality of display control elements corresponding to the plurality of colors (fifth structure).

In the supply period of the data signal to the display control element, the voltage level of the source electrode varies at the start and end of the supply of the data signal, but is relatively stable in other periods. With the fifth structure, the supply period of the data signal to the display control element corresponding to the color lowest in luminosity is longest, so that the period during which the voltage level of the source electrode is stable, which temporally overlaps with the touch position detection process period, can be increased. This prevents a decrease in accuracy of the touch position detection process due to the supply of the data signal to the display control element.

In any of the first to fifth structures, the plurality of colors include red, green, and blue, and the color highest in luminosity is green (sixth structure).

[Embodiments]

Embodiments of the present invention are described in detail below with reference to the drawings. The same or corresponding components in the drawings are given the same reference signs, and their description is not repeated. In the drawings referenced below, structures are simplified or schematically illustrated and some structural members are omitted for ease of explanation. The dimensional ratios between the structural members in each drawing do not necessarily represent the actual dimensional ratios.

[First Embodiment]

FIG. 1 is a sectional view of a touch panel-equipped display device 10 in a first embodiment.

As illustrated in FIG. 1, the touch panel-equipped display device 10 includes: a liquid crystal panel 11 capable of displaying an image and detecting position information (touch position) of input performed by the user based on the displayed image; and a backlight device (lighting device) 12 which is an external light source for supplying the liquid crystal panel 11 with light used for display. The touch panel-equipped display device 10 also includes: a chassis 13 storing the backlight device 12; a frame 14 holding the backlight device 12 with the chassis 13; and a bezel (holding member) 15 holding the liquid crystal panel 11 with the frame 14. The backlight device 12 includes at least a light source (e.g. cold-cathode tube, LED, organic EL, etc.), and an optical member having an optical function of, for example, converting light emitted from the light source into surface light.

The touch panel-equipped display device 10 in this embodiment is used in any of various electronic devices (not illustrated) such as mobile phones (including smartphones), notebook computers (including tablet notebook computers), portable information terminals (including electronic books and PDAs), digital photo frames, and portable game machines.

Figure 2:
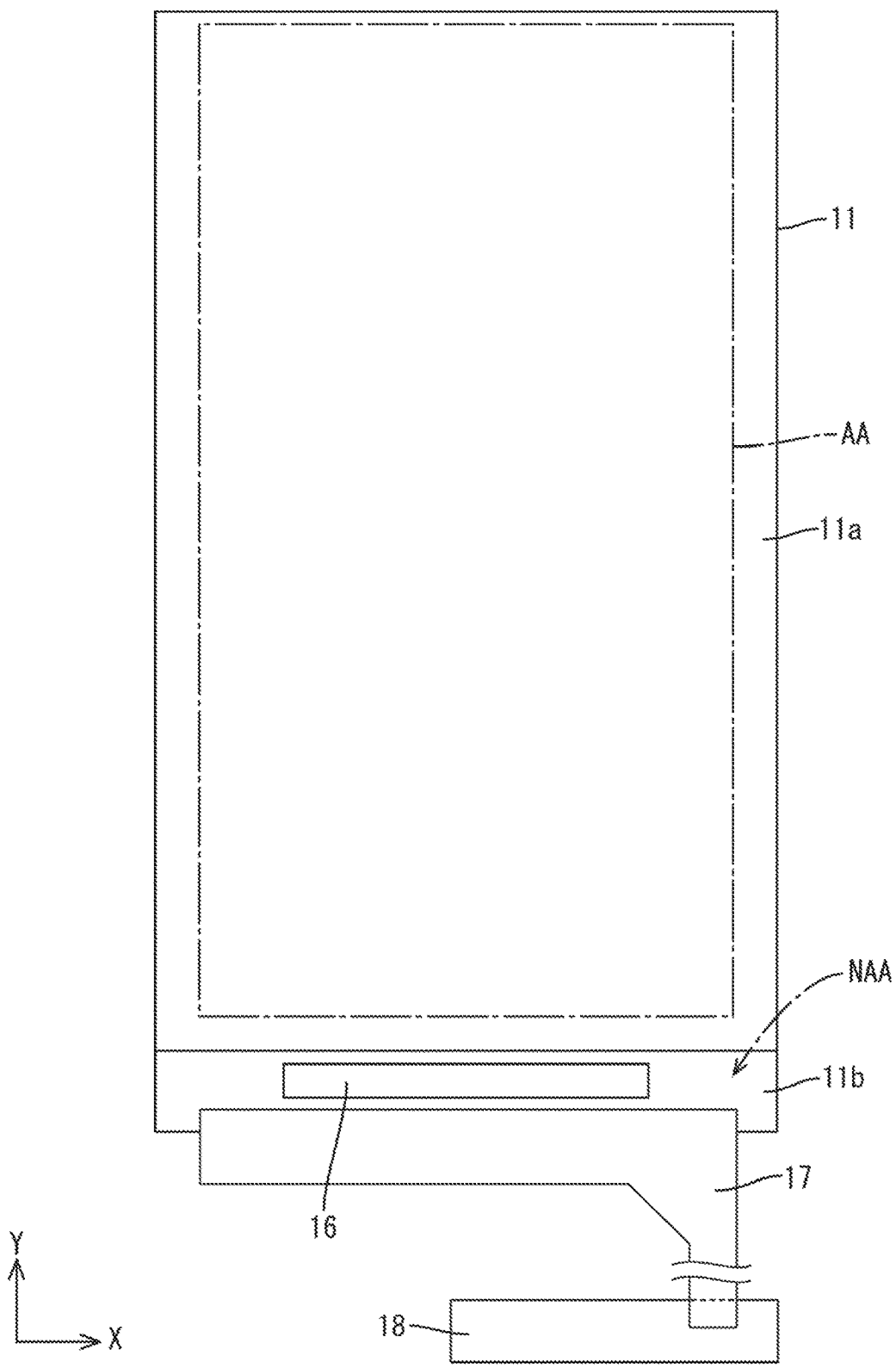
FIG. 2 is a plan view of a liquid crystal panel included in the touch panel-equipped display device in the first embodiment.

FIG. 2 is a plan view of the liquid crystal panel 11 included in the touch panel-equipped display device 10 in the first embodiment. The liquid crystal panel 11 has a vertically long quadrate (rectangular) shape as a whole, as illustrated in FIG. 2. The long-side direction of the liquid crystal panel 11 coincides with the Y-axis direction, and the short-side direction of the liquid crystal panel 11 coincides with the X-axis direction. The liquid crystal panel 11 is divided into a display region (active area) AA capable of image display and a non-display region (non-active area) NAA shaped like a frame surrounding the display region AA and not capable of image display.

The display region AA is closer to one end (upper side in FIG. 2) in the long-side direction of the liquid crystal panel 11. The non-display region NAA is made up of an approximately frame-shaped region (a frame part in the below-mentioned CF substrate 11a) surrounding the display region AA, and a region (a part of the below-mentioned active matrix substrate 11b not overlapping with the CF substrate 11a and exposed) at the other end (lower side in FIG. 2) in the long-side direction. In the non-display region NAA, the region at the other end in the long-side direction is a mounting region in which a driver (display control unit, source driver) 16 for driving the liquid crystal panel 11 and a flexible substrate (external connection component) 17 are mounted.

The flexible substrate 17 has flexibility. The flexible substrate 17 connects the liquid crystal panel 11 to a control circuit substrate 18 which is an external signal supply source, and is capable of transmitting various signals supplied from the control circuit substrate 18 to the driver 16 and the like.

The driver 16 is composed of an LSI chip having a drive circuit inside. The driver 16 processes an input signal supplied from the control circuit substrate 18 to generate an output signal, and outputs the output signal to the below-mentioned column control circuit unit 37a. In FIG. 2, the dashed-dotted frame smaller than the CF substrate 11a represents the outline of the display region AA, with the region outside the dashed-dotted frame being the non-display region NAA.

Figure 3:
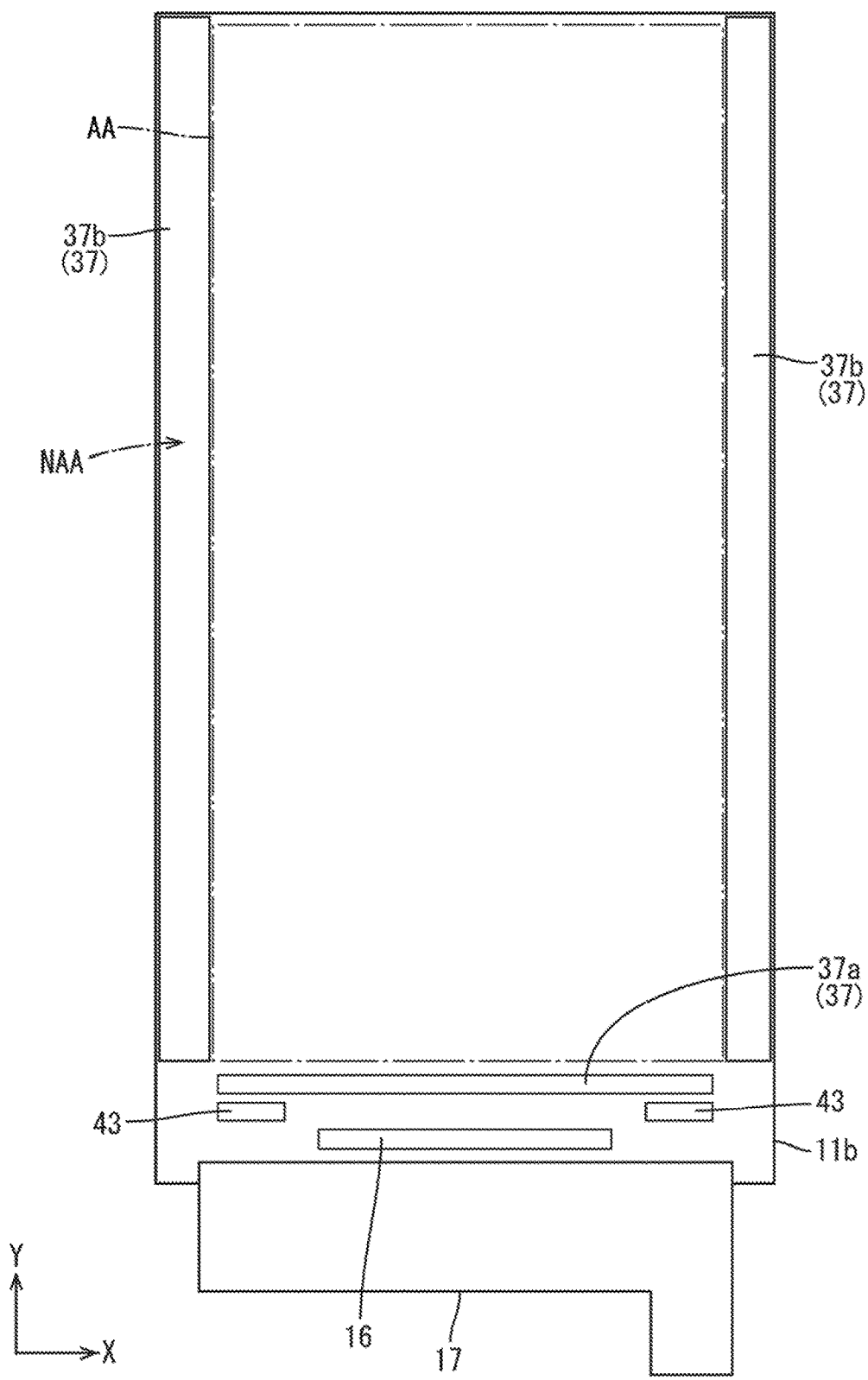
FIG. 3 is a plan view of an active matrix substrate included in the liquid crystal panel.
Figure 4:
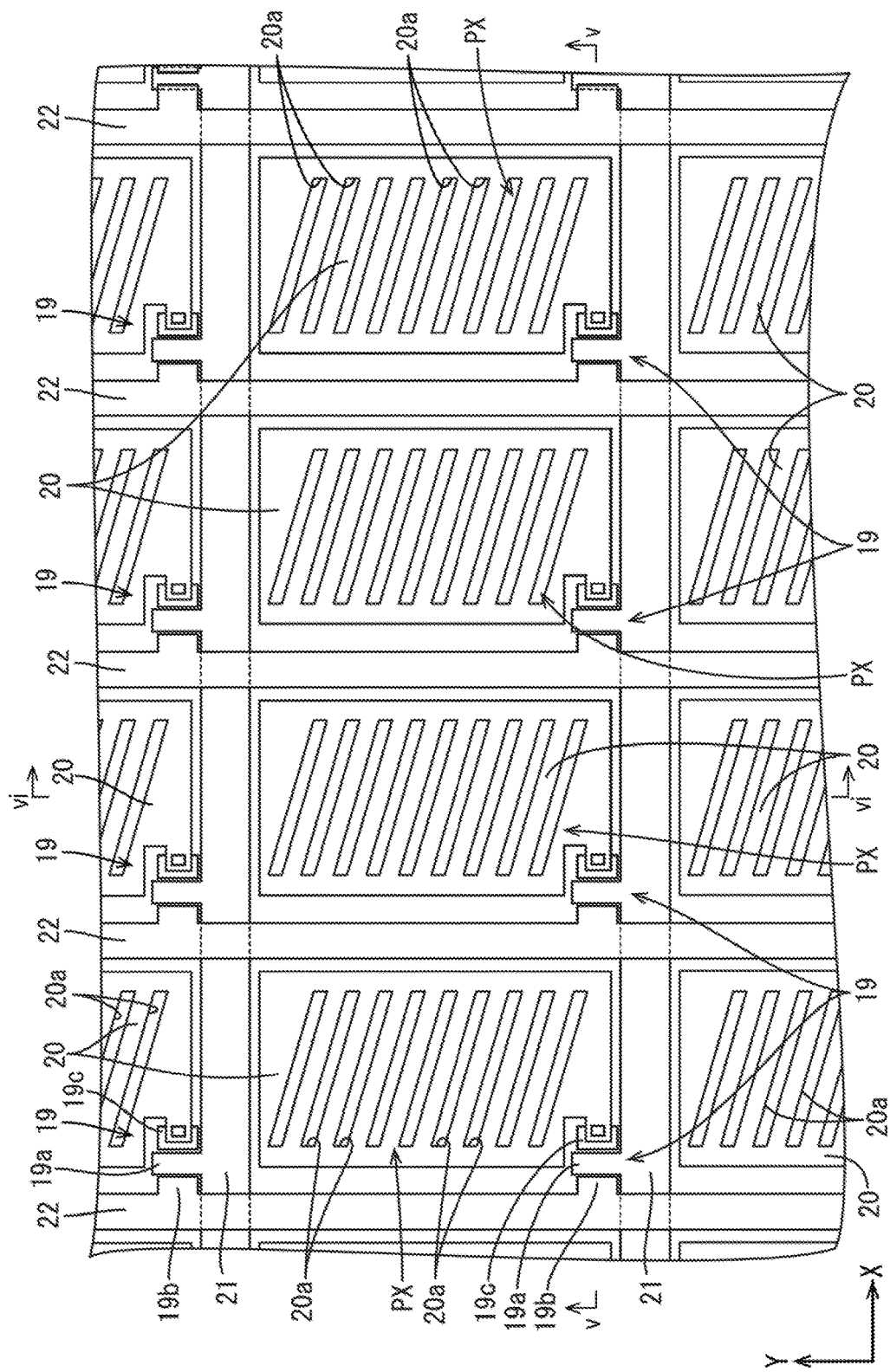
FIG. 4 is an enlarged view of a center part of the active matrix substrate.
Figure 5:
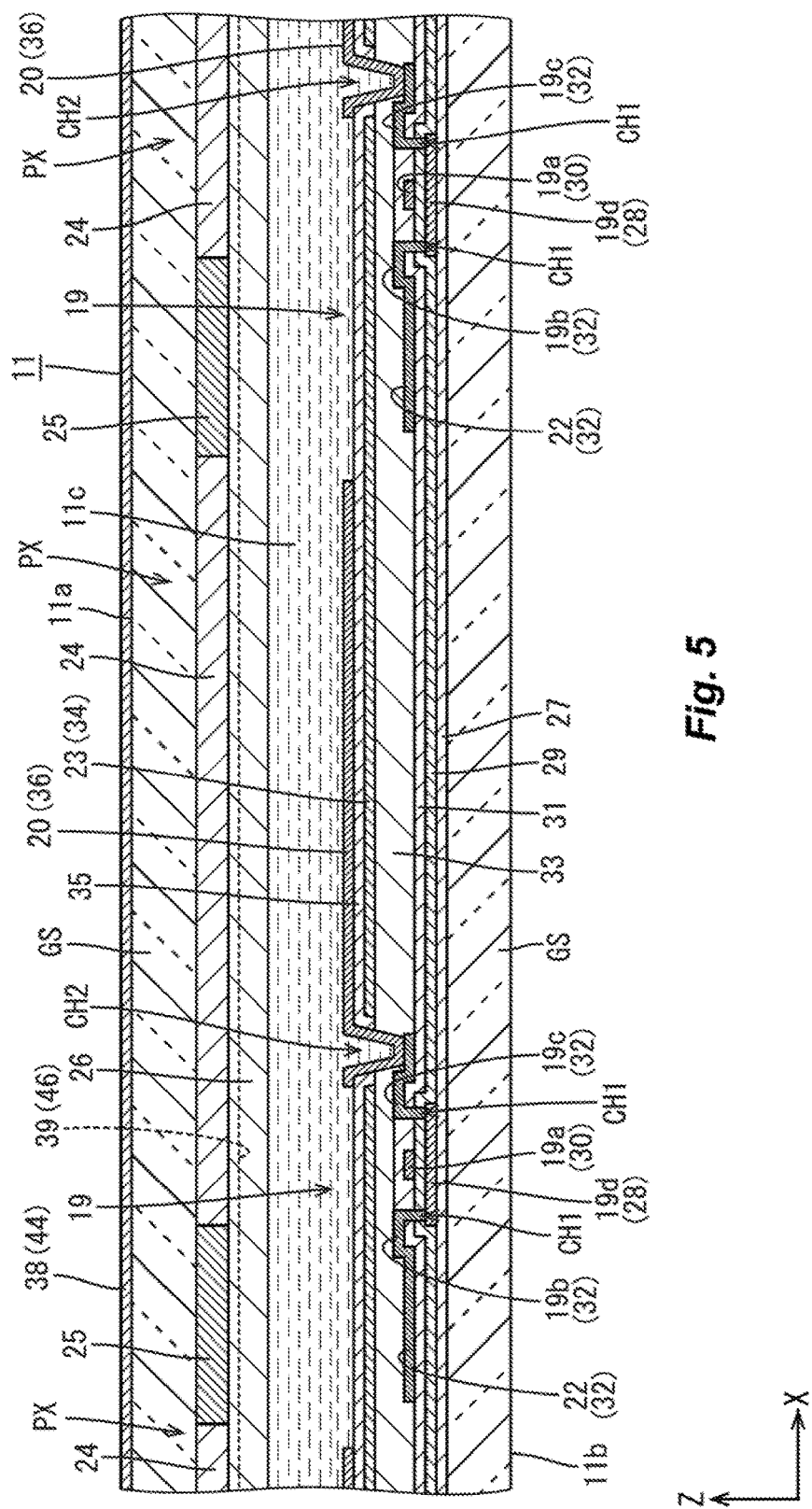
FIG. 5 is a sectional view along v-v line in FIG. 4.
Figure 6:
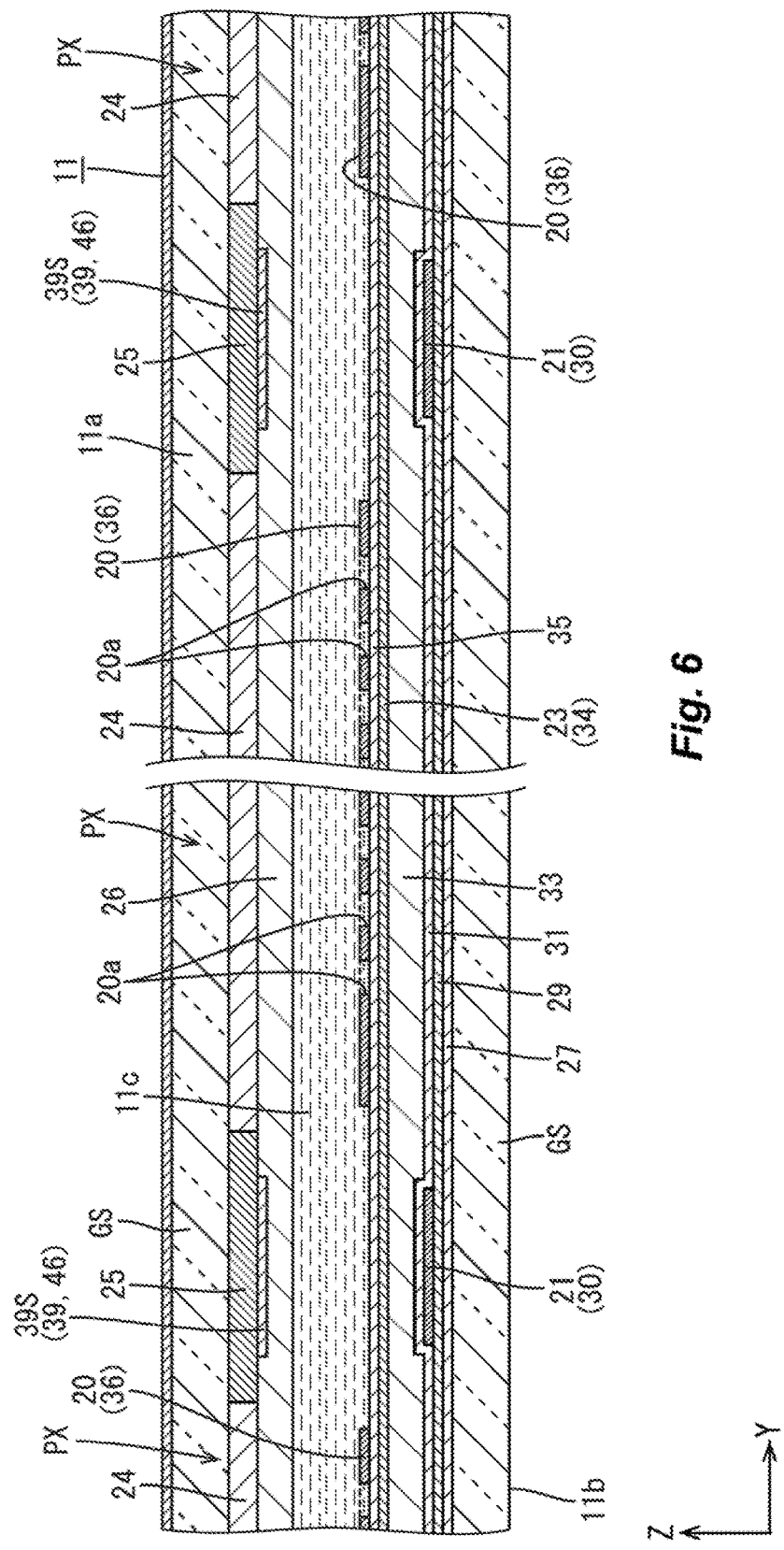
FIG. 6 is a sectional view along vi-vi line in FIG. 4.

The structure of the liquid crystal panel 11 is described below. FIG. 3 is a plan view of the active matrix substrate 11b included in the liquid crystal panel 11. FIG. 4 is an enlarged view of a center part of the active matrix substrate 11b. FIG. 5 is a sectional view along v-v line in FIG. 4. FIG. 6 is a sectional view along vi-vi line in FIG. 4.

The liquid crystal panel 11 includes: a pair of substrates 11a and 11b; and a liquid crystal layer 11c located between the substrates 11a and 11b and containing liquid crystal molecules which are a substance that changes in optical property with electric field application, as illustrated in FIGS. 4 and 5. The substrates 11a and 11b are bonded together by a seal portion (not illustrated), in a state where the gap corresponding to the thickness of the liquid crystal layer 11c is maintained. The front side (front surface side) of the pair of substrates 11a and 11b is the CF substrate (counter substrate) 11a, and the back side (back surface side) of the pair of substrates 11a and 11b is the active matrix substrate (array substrate, element substrate) 11b.

The CF substrate 11a and the active matrix substrate 11b include an approximately transparent (highly translucent) glass substrate GS, and are formed by stacking various films on the glass substrate GS by a known photolithography method or the like.

The CF substrate 11a has a short-side dimension approximately equal to that of the active matrix substrate 11b and a long-side dimension smaller than that of the active matrix substrate 11b, as illustrated in FIG. 2. The CF substrate 11a is bonded to the active matrix substrate 11b in a state of being aligned at one end (upper side in FIG. 2) in the long-side direction. Hence, the other end (lower side in FIG. 2) of the active matrix substrate 11b in the long-side direction has, across a predetermined range, both front and back surfaces exposed to the outside without overlapping with the CF substrate 11a. The mounting region for the driver 16 and the flexible substrate 17 mentioned above is secured in this exposed part.

An oriented film (not illustrated) for orienting the liquid crystal molecules contained in the liquid crystal layer 11c is formed on the inner side of each of the substrates 11a and 11b. A polarization plate (not illustrated) is attached to the outer side of each of the substrates 11a and 11b.

The structure in the display region AA in the active matrix substrate 11b and the CF substrate 11a is briefly described below. Multiple thin film transistors (TFTs) (display control elements) 19 which are switching elements and multiple pixel electrodes 20 are arranged in a matrix in the display region AA on the inner side (the liquid crystal layer 11c side, i.e. the side facing the CF substrate 11a) of the active matrix substrate 11b, as illustrated in FIG. 4. Gate lines 21 and source lines 22 in a grid pattern are arranged around the TFTs 19 and the pixel electrodes 20. In other words, the TFTs 19 and the pixel electrodes 20 are arranged in a matrix at the intersections of the gate lines 21 and the source lines 22 in a grid pattern. The TFTs 19 and the pixel electrodes 20 each correspond to any of the colors R (red), G (green), and B (blue) constituting the below-mentioned color filter 24.

A plurality of gate lines 21 each extending along the X-axis direction (row direction) are arranged along the Y-axis direction (column direction). A plurality of source lines 22 each extending along the Y-axis direction are arranged along the X-axis direction. The gate line 21 is connected to a gate electrode 19a of the TFT 19. The source line 22 is connected to a source electrode 19b of the TFT 19. The pixel electrode 20 is connected to a drain electrode 19c of the TFT 19.

The gate line 21 transmits a scan signal Vscan supplied to the gate electrode 19a of the TFT 19. The source line 22 transmits a data signal Vpix supplied to the source electrode 19b of the TFT 19. These TFTs 19, pixel electrodes 20, gate lines 21, and source lines 22 constitute part of a display circuit for image display. The structure of the TFT 19 will be described in detail later.

The active matrix substrate 11b is provided with a common electrode 23 that, when supplied with a common potential (reference potential), forms an electric field with the pixel electrode 20, as illustrated in FIGS. 5 and 6. Thus, the operation mode of the liquid crystal panel 11 in this embodiment is fringe field switching (FFS) mode which is an improvement to in-plane switching (IPS) mode. The pixel electrode 20 and the common electrode 23 are formed in the active matrix substrate 11b.

A plurality of slits 20a each extending along an oblique direction with respect to the X-axis direction and the Y-axis direction in a plan view are arranged in the pixel electrode 20, as illustrated in FIG. 4. With these slits 20a, when there is a potential difference between the pixel electrode 20 and the common electrode 23, a fringe electric field (oblique electric field) including not only a component along the plate plane of the active matrix substrate 11b but also a component in the direction of the normal to the plate plane of the active matrix substrate 11b is applied to the liquid crystal layer 11c. The use of such a fringe electric field enables appropriate switching of the orientation state of the liquid crystal molecules contained in the liquid crystal layer 11c.

The color filter 24 in which colored portions of the colors such as R (red), G (green), and B (blue) are arranged in a matrix is provided in the display region AA on the inner side (the liquid crystal layer 11c side, i.e. the side facing the active matrix substrate 11b) of the CF substrate 11a in order to produce color image display, as illustrated in FIGS. 5 and 6. Each colored portion of the color filter 24 overlaps the corresponding pixel electrode 20 on the active matrix substrate 11b side in a plan view, as illustrated in FIG. 5.

An approximately grid-shaped light shielding portion (black matrix) 25 for preventing color mixture is formed between the colored portions of the color filter 24, as illustrated in FIGS. 5 and 6. The light shielding portion 25 overlaps the gate line 21 and the source line 22 in a plan view. A planarizing film (protective film, overcoat film) 26 is provided on the surfaces of the color filter 24 and light shielding portion 25.

In the liquid crystal panel 11, a combination of the colored portions of the three colors of R (red), G (green), and B (blue) and three pixel electrodes 20 facing these colored portions constitute one display pixel which is a unit of display. One display pixel is composed of pixel portions (subpixels) PX of the three colors of R, G, and B. Each pixel portion PX is composed of a pair of a pixel electrode 20 and a colored portion facing the pixel electrode 20. These pixel portions PX of the respective colors are repeatedly arranged along the row direction (X-axis direction) in the plate plane of the liquid crystal panel 11, thus constituting a pixel portion PX group. Multiple pixel portion PX groups are arranged along the column direction (Y-axis direction). The light shielding portion 25 is located to separate adjacent pixel portions PX.

A specific stacking order of various films stacked on the inner side of the active matrix substrate 11b by, for example, a known photolithography method and the like are described in detail below. A structure for achieving an image display function (display function) from among the functions of the liquid crystal panel 11 is mainly provided in the active matrix substrate 11b. In detail, a base coat film 27, a semiconductor film 28, a gate insulation film (inorganic insulation film) 29, a first metal film (gate metal film) 30, a first interlayer insulation film (inorganic insulation film) 31, a second metal film (source metal film) 32, a planarizing film (organic insulation film) 33, a first transparent electrode film 34, a second interlayer insulation film (inorganic insulation film) 35, and a second transparent electrode film 36 are stacked in the active matrix substrate 11b sequentially from the lower layer side (the glass substrate GS side or the back side), as illustrated in FIG. 5. Moreover, the above-mentioned oriented film is formed on the upper layer side of the second interlayer insulation film 35 and second transparent electrode film 36, although not illustrated.

The base coat film 27 is a planar pattern covering the whole surface of the glass substrate GS forming the active matrix substrate 11b, and is made of, for example, silicon oxide ($SiO_2$), silicon nitride ($SiN_x$), or silicon nitride oxide (SiNO).

The semiconductor film 28 is stacked on the upper layer side of the base coat film 27, and patterned so as to be situated in each of the display region AA and the non-display region NAA. The semiconductor film 28 is patterned in an island shape according to the below-mentioned arrangement of the TFTs 19, at least in the display region AA. The semiconductor film 28 is made up of, for example, a continuous grain silicon (CG silicon) thin film which is one type of polycrystalline silicon thin film (polysilicon thin film).

The gate insulation film 29 is stacked on the upper layer side of the base coat film 27 and semiconductor film 28, and is a planar pattern extending over the display region AA and the non-display region NAA. The gate insulation film 29 is made of, for example, silicon oxide ($SiO_2$).

The first metal film 30 is stacked on the upper layer side of the gate insulation film 29, and pattered so as to be situated in each of the display region AA and the non-display region NAA. The first metal film 30 is made up of, for example, a stacked film of titanium (Ti) and copper (Cu). The first metal film 30 forms the above-mentioned gate lines 21 and gate electrodes 19a, etc.

The first interlayer insulation film 31 is stacked on the upper layer side of the gate insulation film 29 and first metal film 30, and is a planar pattern extending over the display region AA and the non-display region NAA. The first interlayer insulation film 31 is made of, for example, silicon oxide ($SiO_2$). The first interlayer insulation film 31 keeps the state of insulation between the intersections of the gate lines 21 and the source lines 22.

The second metal film 32 is stacked on the upper layer side of the first interlayer insulation film 31, and pattered so as to be situated in each of the display region AA and the non-display region NAA. The second metal film 32 is made up of, for example, a stacked film of titanium (Ti) and copper (Cu). The second metal film 32 forms the source lines 22, the source electrodes 19b, the drain electrodes 19c, etc.

The planarizing film 33 is stacked on the upper layer side of the first interlayer insulation film 31 and second metal film 32, and is a planar pattern extending over the display region AA and the non-display region NAA. The planarizing film 33 is made of, for example, an acrylic resin material such as polymethylmethacrylate resin (PMMA).

The first transparent electrode film 34 is stacked on the upper layer side of the planarizing film 33, and formed as an approximately planar pattern at least in the display region AA. The first transparent electrode film 34 is made of, for example, a transparent electrode material such as indium tin oxide (ITO) or zinc oxide (ZnO). The first transparent electrode film 34 forms the common electrodes 23 which are an approximately planar pattern.

The second interlayer insulation film 35 is stacked on the upper layer side of the planarizing film 33 and first transparent electrode film 34, and is a planar pattern extending over the display region AA and the non-display region NAA. The second interlayer insulation film 35 is made of, for example, silicon nitride ($SiN_x$).

The second transparent electrode film 36 is stacked on the upper layer side of the second interlayer insulation film 35, and patterned in an island shape according to the arrangement of the TFTs 19 in the display region AA. The second transparent electrode film 36 is made of, for example, a transparent electrode material such as indium tin oxide (ITO) or zinc oxide (ZnO). The second transparent electrode film 36 forms the pixel electrodes 20.

In each of the gate insulation film 29, the first interlayer insulation film 31, the planarizing film 33, and the second interlayer insulation film 35, openings such as contact holes CH1 and CH2 are formed at predetermined positions through patterning in the manufacturing process of the active matrix substrate 11b.

Each TFT 19 located in the display region AA in the active matrix substrate 11b is top gate (staggered) type. In detail, the TFT 19 includes: a channel portion 19d formed by the semiconductor film 28; the gate electrode 19a overlaid on the upper layer side of the channel portion 19d with the gate insulation film 29 in between; and the source electrode 19b and the drain electrode 19c overlaid on the upper layer side of the gate electrode 19a with the first interlayer insulation film 31 in between, as illustrated in FIG. 5.

The source electrode 19b and the drain electrode 19c are connected to the channel portion 19d, through the contact hole CH1 formed in each of the gate insulation film 29 and the first interlayer insulation film 31. This enables electrons to move between the source electrode 19b and the drain electrode 19c.

The drain electrode 19c of the TFT 19 is electrically connected to the pixel electrode 20 formed by the second transparent electrode film 36, through the contact hole CH2 formed in each of the planarizing film 33 and the second interlayer insulation film 35. Hence, when the gate electrode 19a of the TFT 19 is brought into conduction, current flows between the source electrode 19b and the drain electrode 19c through the channel portion 19d, and a predetermined potential is applied to the pixel electrode 20.

The common electrode 23 formed by the first transparent electrode film 34 overlaps with the corresponding pixel electrode 20 in a plan view, with the second interlayer insulation film 35 in between. As mentioned above, an opening through which the contact part of the pixel electrode 20 passes is formed in the common electrode 23 which is an approximately planar pattern, at the position overlapping with the contact hole CH2 of the planarizing film 33 and second interlayer insulation film 35 in a plan view.

A structure in the non-display region NAA in the active matrix substrate 11b is described below, mainly with reference to FIG. 3. A monolithic circuit unit (display control unit) 37 for display-driving each TFT 19 in the display region AA is provided in the non-display region NAA of the active matrix substrate 11b at the position adjacent to the display region AA, as illustrated in FIG. 3.

The monolithic circuit unit 37 is monolithically formed on the active matrix substrate 11b, based on the same semiconductor film 28 as the TFT 19 in the display region AA. A control circuit for controlling the supply of an output signal to the TFT 19 and its circuit elements are thus formed. The circuit elements in the control circuit include, for example, a circuit TFT (not illustrated) using the semiconductor film 28 as a channel portion. The control circuit includes a circuit line portion (not illustrated) using the first metal film 30 and the second metal film 32. The monolithic circuit unit 37 includes: a column control circuit unit 37a adjacent to the short-side part of the display region AA; and a row control circuit unit (display control unit) 37b adjacent to the long-side part of the display region AA.

The column control circuit unit 37a is located adjacent to the lower short-side part of the display region AA, i.e. located between the display region AA and the driver 16 in the Y-axis direction, as illustrated in FIG. 3. The column control circuit unit 37a is connected to the driver 16 by a connection line (not illustrated) formed on the active matrix substrate 11b.

The column control circuit unit 37a is connected to multiple source lines 22 drawn from the display region AA. The column control circuit unit 37a includes a selective switching circuit (RGB switching circuit) for demultiplexing a multiplexed data signal Vsig included in an output signal from the driver 16 into data signals Vpix, and selectively assigning the demultiplexed data signals Vpix to the source lines 22.

Multiple source lines 22 are arranged along the X-axis direction and connected to the TFTs 19 forming the pixel portions PX of the respective colors of R (red), G (green), and B (blue), in the display region AA of the active matrix substrate 11b. The driver 16 outputs, to the column control circuit unit 37a, the multiplexed data signal Vsig obtained by multiplexing three data signals Vpix (VpixR, VpixG, VpixB) supplied to the pixel portions PX of the respective colors of R, G, and B, and a demultiplexing control signal Vsel for demultiplexing the multiplexed data signal Vsig into the three data signals VpixR, VpixG, and VpixB.

The column control circuit unit 37a, by the above-mentioned selective switching circuit, demultiplexes the multiplexed data signal Vsig into the three data signals VpixR, VpixG, and VpixB based on the demultiplexing control signal Vsel output from the driver 16, and assigns and supplies the demultiplexed data signals VpixR, VpixG, and VpixB to the source lines 22 connected to the pixel portions PX of the respective colors of R, G, and B. With such a structure, the number of connection lines for connecting the column control circuit unit 37a and the driver 16 can be reduced to about ⅓, as compared with the case where the data signals are not multiplexed and are directly supplied from the driver to the source lines 22. The structure is thus suitable for higher resolution.

A pair of row control circuit units 37b are provided so as to sandwich the display region AA from both sides in the X-axis direction, and extend approximately across the full length of the display region AA along the Y-axis direction, as illustrated in FIG. 3. Each row control circuit unit 37b is connected to the flexible substrate 17 by a connection line (not illustrated) formed on the active matrix substrate 11b.

The row control circuit unit 37b is connected to multiple gate lines 21 drawn from the display region AA, and supplies a signal from the control circuit substrate 18 to each gate line 21. The row control circuit unit 37b has a scan circuit for supplying a scan signal Vscan included in an output signal from the control circuit substrate 18 to each gate line 21 at predetermined timing to sequentially scan the gate lines 21.

In detail, the row control circuit unit 37b, by the scan circuit, sequentially supplies the scan signal Vscan from the gate line 21 at the upper end to the gate line 21 at the lower end in the Y-axis direction in the display region AA in FIG. 3, to scan the multiple gate lines 21 (the TFT 19 groups forming rows) arranged along the Y-axis direction (column direction). Each gate line 21 is connected with multiple TFTs 19 arranged along the X-axis direction (row direction). Accordingly, when the scan signal Vscan is supplied to a gate line 21, the TFT 19 group connected to the gate line 21 and forming one row is collectively selected and driven. The scan direction for the TFTs 19 by the row control circuit unit 37b coincides with the Y-axis direction.

The liquid crystal panel 11 in this embodiment has both a display function of displaying an image and a position input function (touch position detection function) of detecting position information of input performed by the user based on the displayed image, as mentioned earlier. The liquid crystal panel 11 contains a touch panel pattern TPP for achieving the position input function (in-cell type). The touch panel pattern TPP is projection-capacitance type, and its detection is mutual capacitance type.

Figure 7:
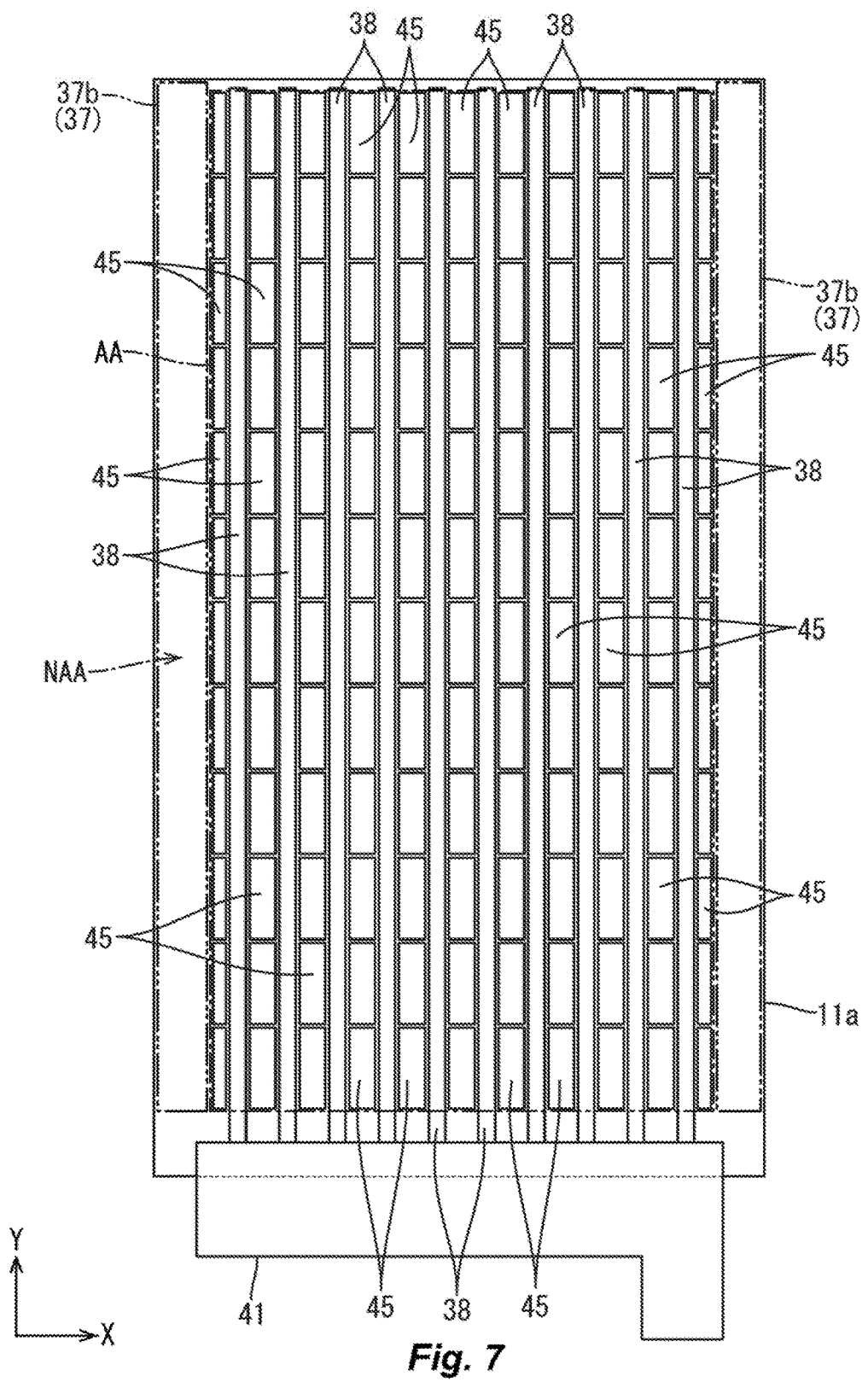
FIG. 7 is a plan view of a CF substrate included in the liquid crystal panel, on the display surface side.
Figure 8:
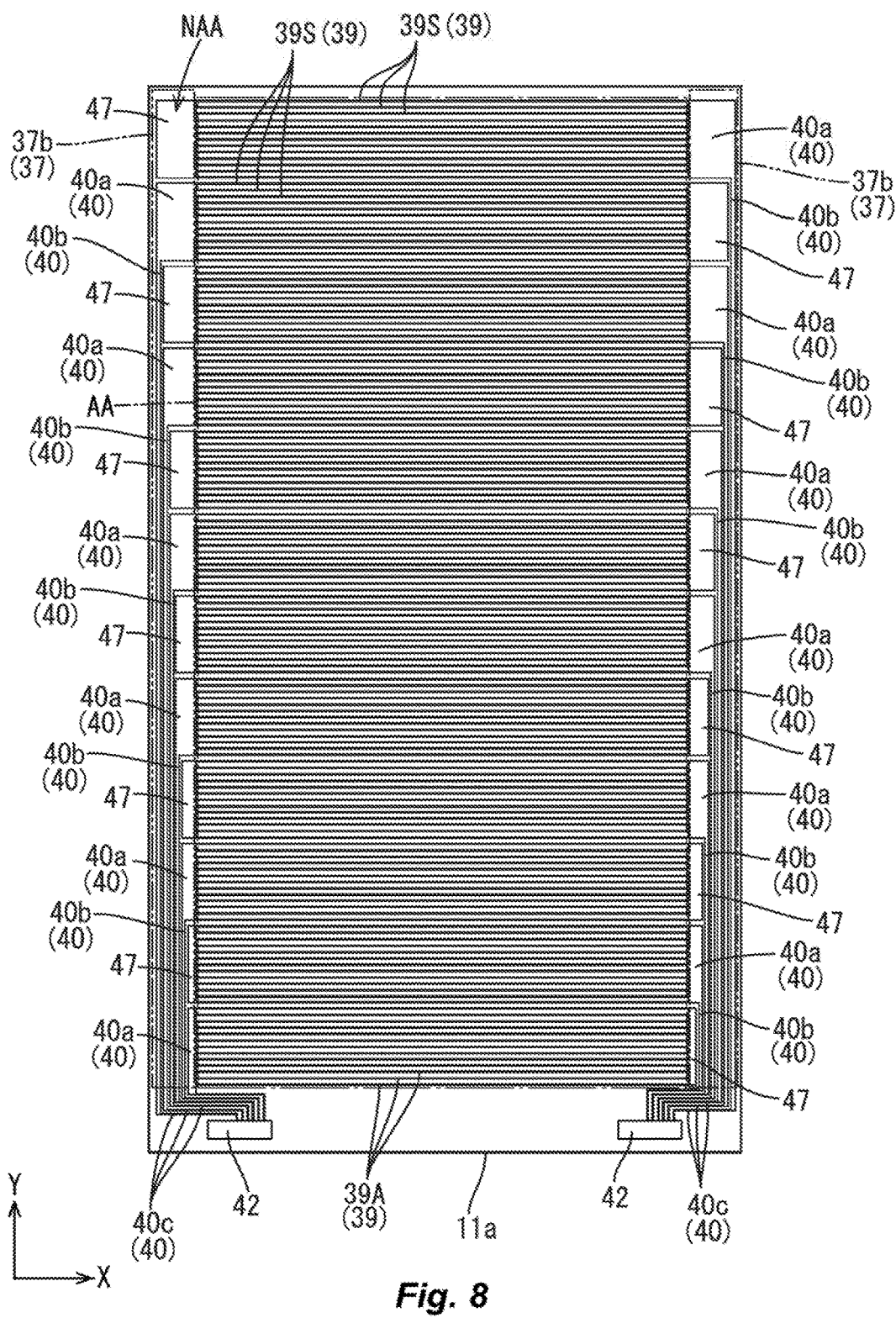
FIG. 8 is a plan view of the CF substrate included in the liquid crystal panel, on the liquid crystal layer side.

FIG. 7 is a plan view of the CF substrate 11a included in the liquid crystal panel 11, on the display surface side. FIG. 8 is a plan view of the CF substrate 11a included in the liquid crystal panel 11, on the liquid crystal layer 11c side.

The touch panel pattern TPP is solely provided in the CF substrate 11a. In detail, the touch panel pattern TPP includes at least a detection electrode 38 and a drive electrode 39, as illustrated in FIGS. 7 and 8. The detection electrode 38 is provided on the display surface side (opposite to the liquid crystal layer 11c side) of the CF substrate 11a. The drive electrode 39 is provided on the side (liquid crystal layer 11c side) of the CF substrate 11a opposite to the display surface side.

With this touch panel pattern TPP, whether or not position input (touch operation) is performed is detected based on the difference in capacitance depending on whether or not there is a matter (such as the user's finger) obstructing the electric field formed between the detection electrode 38 and the drive electrode 39. The detection electrode 38 and the drive electrode 39 constituting the touch panel pattern TPP are located in the display region AA of the CF substrate 11a.

A position detection line portion 40 is provided at both ends in the short-side direction (X-axis direction) which are non-touch regions on the liquid crystal layer 11c side of the CF substrate 11a, as illustrated in FIG. 8. The position detection line portion 40 is connected to the drive electrode 39, and transmits a drive signal Vdri to the drive electrode 39.

A touch panel flexible substrate 41 for transmitting a signal between the control circuit substrate 18 and the CF substrate 11a is connected on the display surface side of one end (lower end in FIGS. 7 and 8) in the long-side direction (Y-axis direction) which is a non-touch region of the CF substrate 11a, as illustrated in FIG. 8. The touch panel flexible substrate 41 approximately overlaps with the display flexible substrate 17 connected to the liquid crystal panel 11, in a plan view.

The control circuit substrate 18 is provided with a touch controller (touch position detection control unit) 48 (see FIG. 9) for performing position detection control. The touch panel flexible substrate 41 transmits a position detection signal Vdet output from the detection electrode 38 of the CF substrate 11a, to the touch controller 48.

A pair of CF substrate-side contact portions (signal supply portions, counter substrate-side signal supply portions) 42 are provided in the part overlapping with the touch panel flexible substrate 41, in the non-touch region on the liquid crystal layer 11c side of the CF substrate 11a. Each CF substrate-side contact portion 42 is connected to, from among both ends of the position detection line portion 40, the end opposite to the end connected to the drive electrode 39.

A pair of active matrix substrate-side contact portions 43 are provided in the part overlapping with the CF substrate-side contact portions 42 in the non-display region NAA on the inner side of the active matrix substrate 11b, as illustrated in FIG. 3. The active matrix substrate-side contact portions 43 are electrically connected to the CF substrate-side contact portions 42.

Each active matrix substrate-side contact portion 43 is connected to the driver 16, through a connection line (not illustrated) formed on the inner surface of the active matrix substrate 11b. Hence, the drive signal Vdri from the touch controller 48 of the control circuit substrate 18 is transmitted sequentially through the flexible substrate 17, the driver 16, the active matrix substrate-side contact portion 43, the CF substrate-side contact portion 42, and the position detection line portion 40, to the drive electrode 39.

A plurality of detection electrodes 38 each extending along the Y-axis direction are arranged at spacings in the X-axis direction in the display region AA on the display surface side of the CF substrate 11a, as illustrated in FIG. 7. Each detection electrode 38 is made up of a transparent electrode film using a transparent electrode material such as indium tin oxide (ITO) or zinc oxide (ZnO), as with the pixel electrode 20, the common electrode 23, etc. One end (lower end in FIG. 7) of the detection electrode 38 is connected to the touch panel flexible substrate 41.

A plurality of floating electrodes 45 are provided adjacent to the detection electrodes 38 in the X-axis direction, as illustrated in FIG. 7. The floating electrodes 45 are physically and electrically separated from the detection electrodes 38, like floating islands. Each floating electrode 45 forms a capacitance with at least a detection electrode 38 adjacent in the X-axis direction. The floating electrode 45 contributes to a higher capacitance value of the detection electrode 38, and is suitable in improving position detection sensitivity (S/N ratio).

A plurality of drive electrodes 39 each extending along the X-axis direction orthogonal to the Y-axis direction which is the extending direction of the detection electrodes 38 are arranged along the Y-axis direction in the display region AA on the inner surface of the CF substrate 11a, as illustrated in FIG. 8. Part of each drive electrode 39 intersects with the detection electrode 38 and the floating electrode 45 in a plan view, and forms a capacitance with each of the detection electrode 38 and the floating electrode 45.

A metal film forming the drive electrode 39 is made of a metal material such as aluminum, molybdenum, titanium, tungsten, copper, silver, or gold. The metal film forming the drive electrode 39 has excellent conductivity, but little translucency. Accordingly, the drive electrode 39 is composed of a plurality of segment drive electrodes 39S that each overlap with the light shielding portion 25 of the CF substrate 11a in a plan view, as illustrated in FIGS. 6 and 8. By concealing the drive electrode 39 from the user by the light shielding portion 25 in this way, external light is less likely to be reflected by the drive electrode 39, and the drive electrode 39 is less visible to the user.

The position detection line portion 40 includes: a first line portion 40a connected to one end of the drive electrode 39; a second line portion 40b extending from the first line portion 40a along the Y-axis direction; and a third line portion 40c in a bent planar shape from the second line portion 40b to the CF substrate-side contact portion 42, as illustrated in FIG. 8. In the non-display region NAA on the liquid crystal layer 11c side of the CF substrate 11a, a dummy line portion 47 is provided for the end of each drive electrode 39 opposite to the end connected to the position detection line portion 40, as illustrated in FIG. 8.

Various films stacked on the liquid crystal layer 11c side (i.e. the side facing the active matrix substrate 11b) of the CF substrate 11a by, for example, a known photolithography method are described below. The light shielding portion 25 and the color filter 24, the drive electrode 39 (metal film 46), and the planarizing film 26 are stacked in the CF substrate 11a sequentially from the lower layer (glass substrate GS) side, as illustrated in FIGS. 5 and 6. An oriented film is stacked on the upper layer side of the planarizing film 26, although not illustrated.

Figure 9:
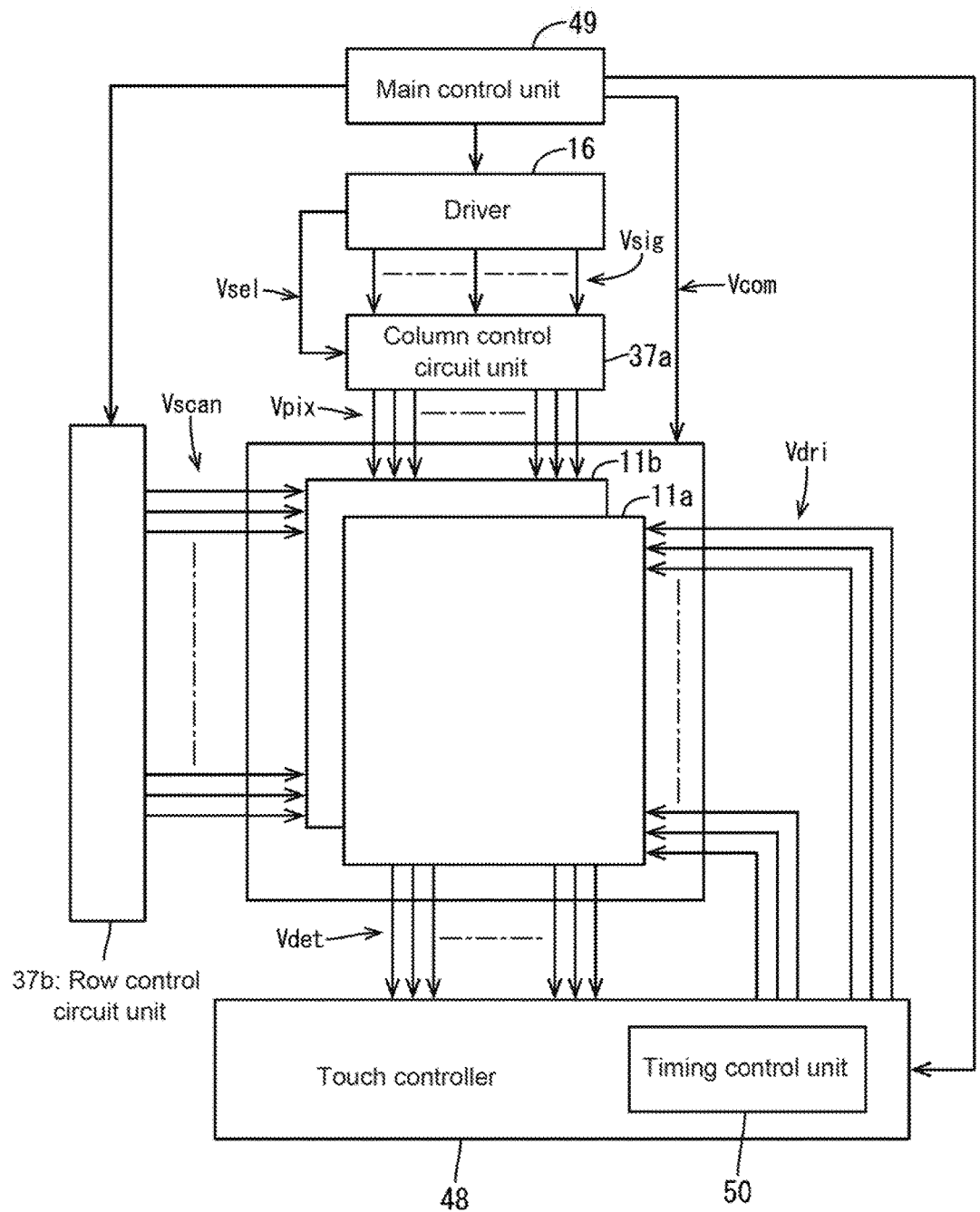
FIG. 9 is a block diagram relating to display and position detection control.
Figure 10:
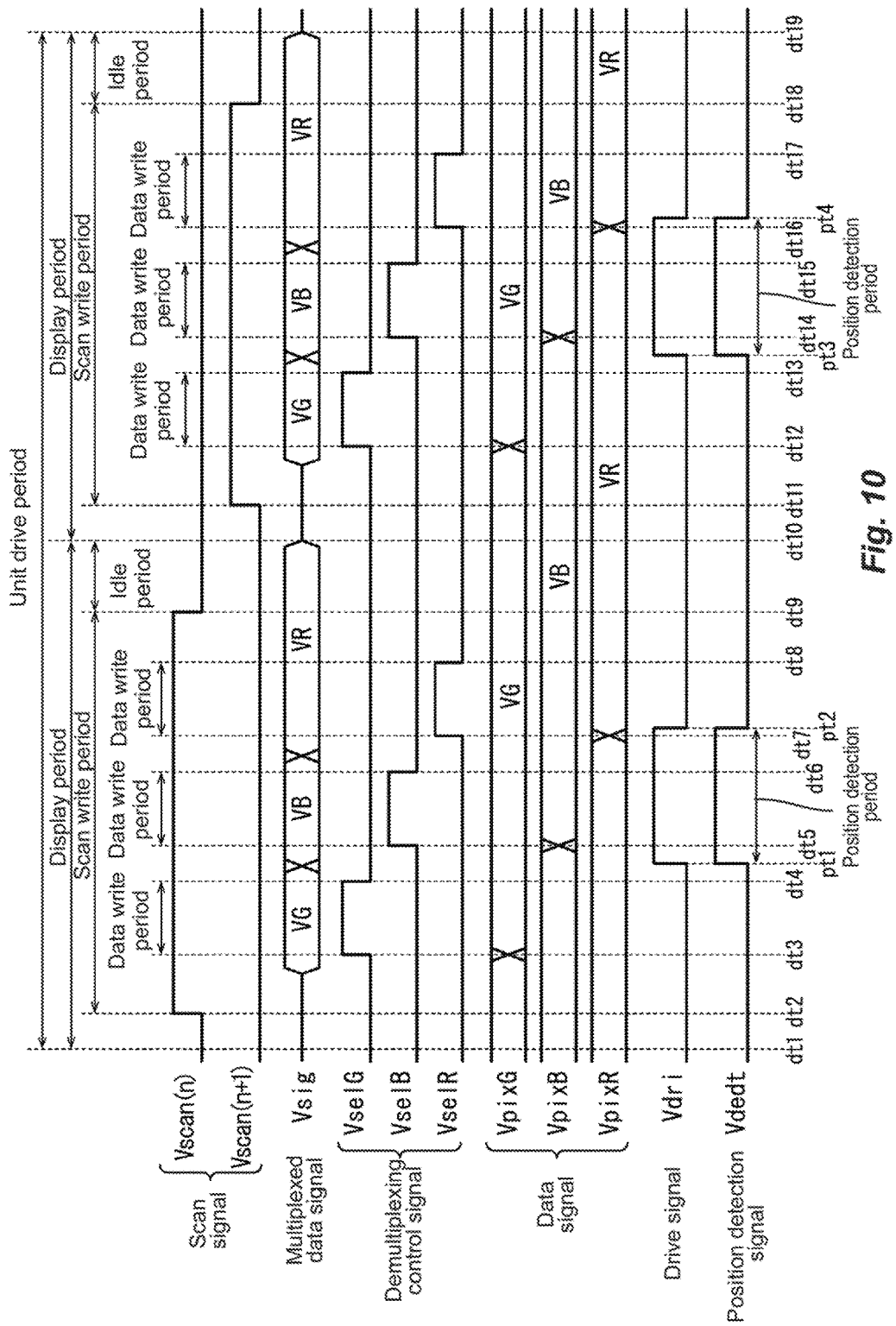
FIG. 10 is a timing chart relating to display and position detection control in the touch panel-equipped display device in the first embodiment.

Display and position detection control in the touch panel-equipped display device 10 in this embodiment is described in detail below, with reference to FIGS. 9 and 10. FIG. 9 is a block diagram relating to display and position detection control in the touch panel-equipped display device 10. FIG. 10 is a timing chart relating to display and position detection control in the touch panel-equipped display device 10.

As a structure relating to display and position detection control, the touch panel-equipped display device 10 includes a main control unit 49, the driver 16, the column control circuit unit 37a, the row control circuit unit 37b, and the touch controller 48, as illustrated in FIG. 9.

The main control unit 49 performs display and position detection control. The main control unit 49 supplies a common potential signal (reference potential signal) Vcom to the common electrode 23 in the active matrix substrate 11b. The driver 16 generates a multiplexed data signal Vsig and a demultiplexing control signal Vsel, based on an image signal and a control signal supplied from the main control unit 49.

The column control circuit unit 37a generates, based on the multiplexed data signal Vsig and the demultiplexing control signal Vsel supplied from the driver 16, a data signal Vpix associated with the pixel portion PX of each color, and assigns and supplies the data signal Vpix to the corresponding source line 22. The row control circuit unit 37b generates a scan signal Vscan based on a control signal supplied from the main control unit 49, and supplies the scan signal Vscan to each gate line 21 so as to sequentially scan the gate lines 21.

The touch controller 48 supplies, based on a control signal output from the main control unit 49, a drive signal Vdri to the drive electrode 39, and detects a position detection signal Vdet output from the detection electrode 38. The touch controller 48 includes a timing control unit 50 for controlling the timing of supplying the drive signal Vdri to the drive electrode 39 to drive the drive electrode 39, and the timing of detecting the position detection signal Vdet output from the detection electrode 38.

The main control unit 49 and the touch controller 48 are provided in the control circuit substrate 18, and connected to the liquid crystal panel 11 through the flexible substrate 17 and the touch panel flexible substrate 41. The driver 16, the column control circuit unit 37a, and the row control circuit unit 37b are provided in the liquid crystal panel 11, as mentioned above.

Display control in the liquid crystal display device 10 is described in detail below. Assuming that the period for collectively selecting and driving a pixel portion PX group forming one row in the X-axis direction is one display period, the main control unit 49 performs display control so that two display periods constitute one unit drive period (timing dt1 to timing dt19), as illustrated in FIG. 10. In detail, the row control circuit unit 37b controlled by the main control unit 49 performs control so that a first display period (timing dt1 to timing dt10) for supplying the scan signal Vscan to the nth gate line 21 from the scan start side in the display region AA and a second display period (timing dt10 to timing dt19) for supplying the scan signal Vscan to the following (n+1)th gate line 21 constitute one unit drive period, where n is a natural number.

One display period includes a scan write period (timing dt2 to timing dt9, timing dt11 to timing dt18) and an idle period (timing dt9 to timing dt10, timing dt18 to timing dt19). The scan write period is a period during which the signal level of the scan signal Vscan supplied to the gate line 21 is high level to drive the TFT 19 group connected to the gate line 21. The idle period is a period during which the signal level of the scan signal Vscan supplied to the gate line 21 is low level to suspend the driving of the TFT 19 group. The idle period is a period (non-scan write period) during which the scan signal Vscan is not written.

The main control unit 49 controls display so that one scan write period includes three data write periods (timing dt3 to timing dt4, timing dt5 to timing dt6, timing dt7 to timing dt8, timing dt12 to timing dt13, timing dt14 to timing dt15, timing dt16 to timing dt17) for supplying the data signal Vpix in a time-division manner to the TFTs 19 corresponding to the respective pixel portions PX of the three colors, as illustrated in FIG. 10.

In detail, the column control circuit unit 37a controlled by the main control unit 49 demultiplexes the multiplexed data signal Vsig supplied from the driver 16 into the data signals VpixG, VpixB, and VpixR of the respective colors based on the demultiplexing control signal Vsel (VselG, VselB, VselR) for the colors. The column control circuit unit 37a time-divides the green data signal VpixG, the blue data signal VpixB, and the red data signal VpixR in this order, and supplies each signal to the source line 22 connected to the pixel portion PX of the corresponding color. The data signals VpixG, VpixB, and VpixR supplied to the source lines 22 are sequentially supplied to the TFTs 19 constituting the pixel portions PX of the respective colors. Of these, only the pixel electrodes 20 connected to the TFT 19 group of each row driven based on the scan signal Vscan are selectively charged.

Each period (timing dt4 to timing dt5, timing dt6 to timing dt7, timing dt8 to timing dt12, timing dt13 to timing dt14, timing dt15 to timing dt16, timing dt17 to timing dt19) between the green data write period (timing dt3 to timing dt4, timing dt12 to timing dt13), the blue data write period (timing dt5 to timing dt6, timing dt14 to timing dt15), and the red data write period (timing dt7 to timing dt8, timing dt16 to timing dt17) is a period (non-data write period) during which the data signal VpixR, VpixG, or VpixB is not written.

Touch position detection control in the touch panel-equipped display device 10 in this embodiment is described in detail below. In the case where, in the scan write period during which the scan signal Vscan of high level is supplied to the gate line 21, the drive signal Vdri is supplied to the drive electrode 39 to detect a touch position, there is a possibility that the voltage level of the common electrode 23 varies as a result of starting the supply of the drive signal Vdri to the drive electrode 39. In detail, as a result of starting the supply of the drive signal Vdri to the drive electrode 39, the voltage level of the common electrode 23 increases temporarily, and then converges to a predetermined potential. If the data write of the pixel portion PX to which data is being written ends before the convergence of the potential, the write voltage changes as compared with the case of performing data write in a state where the drive signal Vdri is not supplied to the drive electrode 39. This can cause noise in image display. Particularly, if the supply of the drive signal Vdri to the drive electrode 39 is started during the data write of the green pixel portion PX which is the color highest in luminosity of red, green, and blue, a change in luminance level of the green pixel tends to cause an influence (display noise) on image display.

Accordingly, in this embodiment, the supply of the drive signal Vdri to the drive electrode 39 is started in a period that is within the scan write period and is other than the data write period of the green pixel portion PX which is the color highest in luminosity and is likely to be influenced most by the supply of the drive signal Vdri to the drive electrode 39. In particular, in this embodiment, the supply of the drive signal Vdri to the drive electrode 39 is started in a period that is within the scan write period and is between when the data write of the pixel portion PX to which data is written immediately before the data write of the blue pixel portion PX lowest in luminosity ends and when the data write of the blue pixel portion PX lowest in luminosity starts.

In this embodiment, the data write of one display pixel is performed in the order of the green pixel portion PX, the blue pixel portion PX, and the red pixel portion PX. Green is the color highest in luminosity, and blue is the color lowest in luminosity. In other words, luminosity increases in the order of blue, red, and green.

The main control unit 49 performs control so that the supply of the drive signal Vdri to the drive electrode 39 is started in a period that is within the scan write period and is between when the data write of the green pixel portion PX to which data is written immediately before the data write of the blue pixel portion PX lowest in luminosity ends and when the data write of the blue pixel portion PX lowest in luminosity starts. In detail, the touch controller 48 controlled by the main control unit 49 performs touch position detection control so that the timing pt1 (timing pt3) of supplying the drive signal Vdri to the drive electrode 39 is between the timing dt4 (timing dt13) at which the data write period of the green pixel portion PX ends and the timing dt5 (timing dt14) at which the data write period of the blue pixel portion PX starts.

By setting the timing of supplying the drive signal Vdri to the drive electrode 39 to be between the date writes of adjacent pixel portions PX, an influence on image display can be reduced as compared with the case of supplying the drive signal Vdri to the drive electrode 39 during the data write period of the pixel portion PX. Moreover, since the supply of the drive signal Vdri to the drive electrode 39 is started between the data write period of the green pixel portion PX and the data write period of the blue pixel portion PX, the color influenced most by starting the supply of the drive signal Vdri to the drive electrode 39 can be limited to blue lowest in luminosity. An influence on image display caused by the supply of the drive signal Vdri to the drive electrode 39 can thus be suppressed. Furthermore, since the supply of the drive signal Vdri to the drive electrode 39 is started after the data write of the green pixel portion PX highest in luminosity of red, green, and blue, a change in luminance level of green highest in luminosity can be prevented, with it being possible to effectively suppress an influence on image display caused by the supply of the drive signal Vdri to the drive electrode 39.

The data write of one display pixel may be performed in the order of the red pixel portion PX, the green pixel portion PX, and the blue pixel portion PX. In this case, too, the timing of starting the supply of the drive signal Vdri to the drive electrode 39 is set in a period that is within the scan write period and is between when the data write of the green pixel portion PX highest in luminosity ends and when the data write of the blue pixel portion PX lowest in luminosity starts.

Although the timing pt2 or the timing pt4 at which the supply of the drive signal Vdri to the drive electrode 39 ends is in the data write period of the red pixel portion PX in the timing chart in FIG. 10, the timing pt2 or the timing pt4 is not limited to be in this period.

Figure 11:
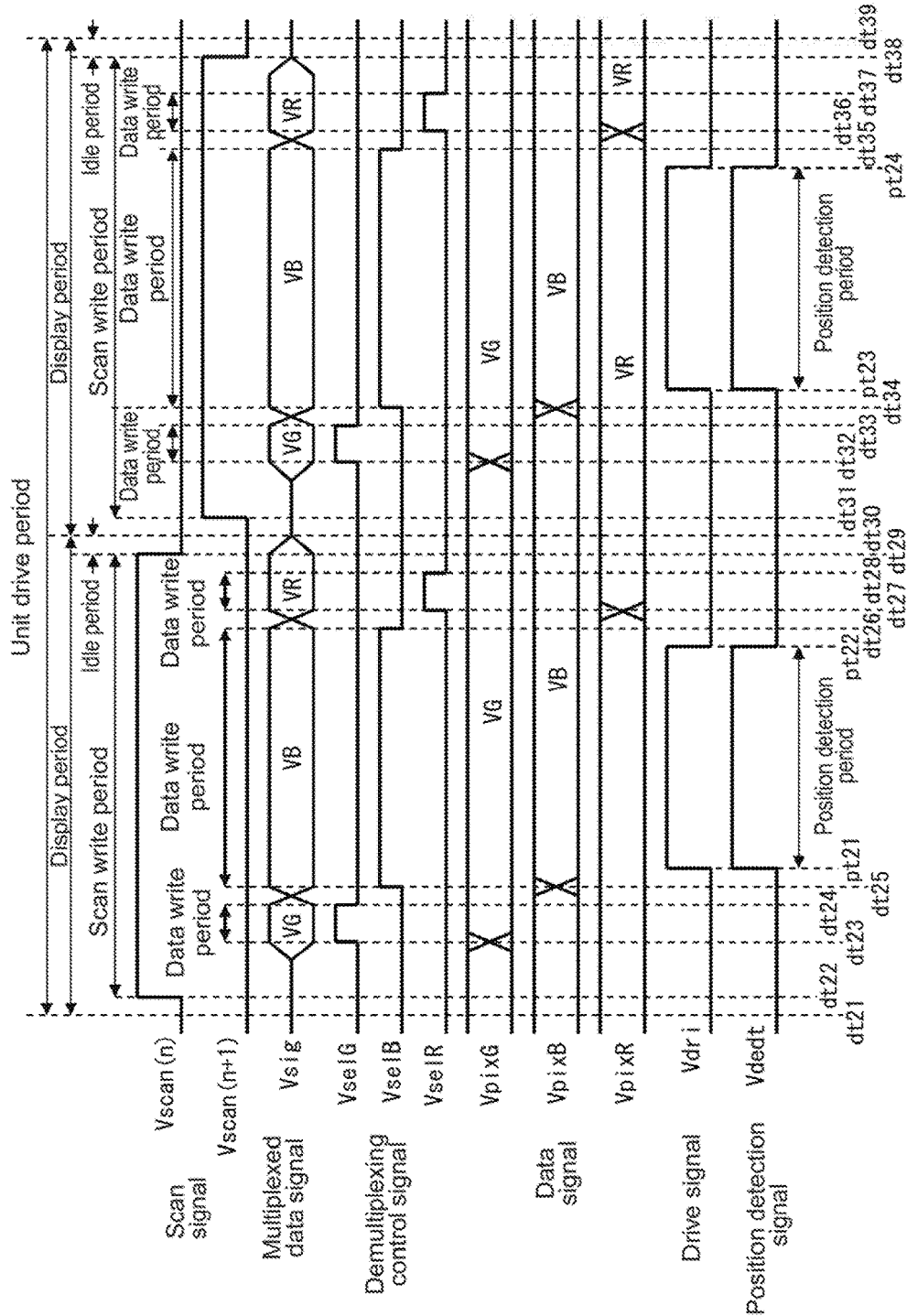
FIG. 11 is a timing chart relating to display and position detection control in a touch panel-equipped display device in a second embodiment.

[Second Embodiment]
FIG. 11 is a timing chart relating to display and position detection control in a touch panel-equipped display device 10A in a second embodiment. In this embodiment, too, the data write of one display pixel is performed in the order of the green pixel portion PX, the blue pixel portion PX, and the red pixel portion PX.

In this embodiment, the supply of the drive signal Vdri to the drive electrode 39 is started (timing pt21, timing pt23) during the data write of the blue pixel portion PX lowest in luminosity (timing dt25 to timing dt26, timing dt34 to timing dt35). Here, from among the data write periods of the green, blue, and red pixel portions PX constituting one display pixel, the data write period of the blue pixel portion PX (timing dt25 to timing dt26, timing dt34 to timing dt35) is longer than the data write period of the green pixel portion PX (timing dt23 to timing dt24, timing dt32 to timing dt33) and the data write period of the red pixel portion PX (timing dt27 to timing dt28, timing dt36 to timing dt37). As an example, the data write period of the blue pixel portion PX is 3.5 µs, and the data write period of each of the green and red pixel portions PX is 1.3 µs.

The timing pt22 or pt24 at which the supply of the drive signal Vdri to the drive electrode 39 ends is in the data write period of the blue pixel portion PX (timing dt25 to timing dt26, timing dt34 to timing dt35), as illustrated in FIG. 11.

The touch panel-equipped display device 10A in this embodiment starts the supply of the drive signal Vdri to the drive electrode 39 during the data write of the blue pixel portion PX lowest in luminosity. An influence on image display caused by the supply of the drive signal Vdri to the drive electrode 39 can thus be suppressed.

In the data write period of the pixel portion PX, the voltage level of the source electrode 19*b* varies at the start and end of the data write, but is relatively stable in other periods. Hence, by performing the touch position detection process in the period during which the voltage level of the source electrode 19*b* is stable, a touch position can be detected accurately.

In the touch panel-equipped display device 10A in this embodiment, the data write period of the blue pixel portion PX in which the timing of performing the touch position detection process is included is longer than the data write period of each of the green and red pixel portions PX. In this way, the period during which the voltage level of the source electrode 19*b* is stable, which temporally overlaps with the touch position detection period, can be increased. In other words, since touch position detection is performed in the period during which the voltage level of the source electrode 19*b* is stable, a decrease in accuracy of the touch position detection process due to the data write of the pixel portion PX can be prevented.

Thus, the touch panel-equipped display device 10A in this embodiment can improve touch position detection accuracy as compared with the touch panel-equipped display device in the first embodiment, while suppressing an influence on image display caused by the supply of the drive signal Vdri to the drive electrode 39.

Figure 12:
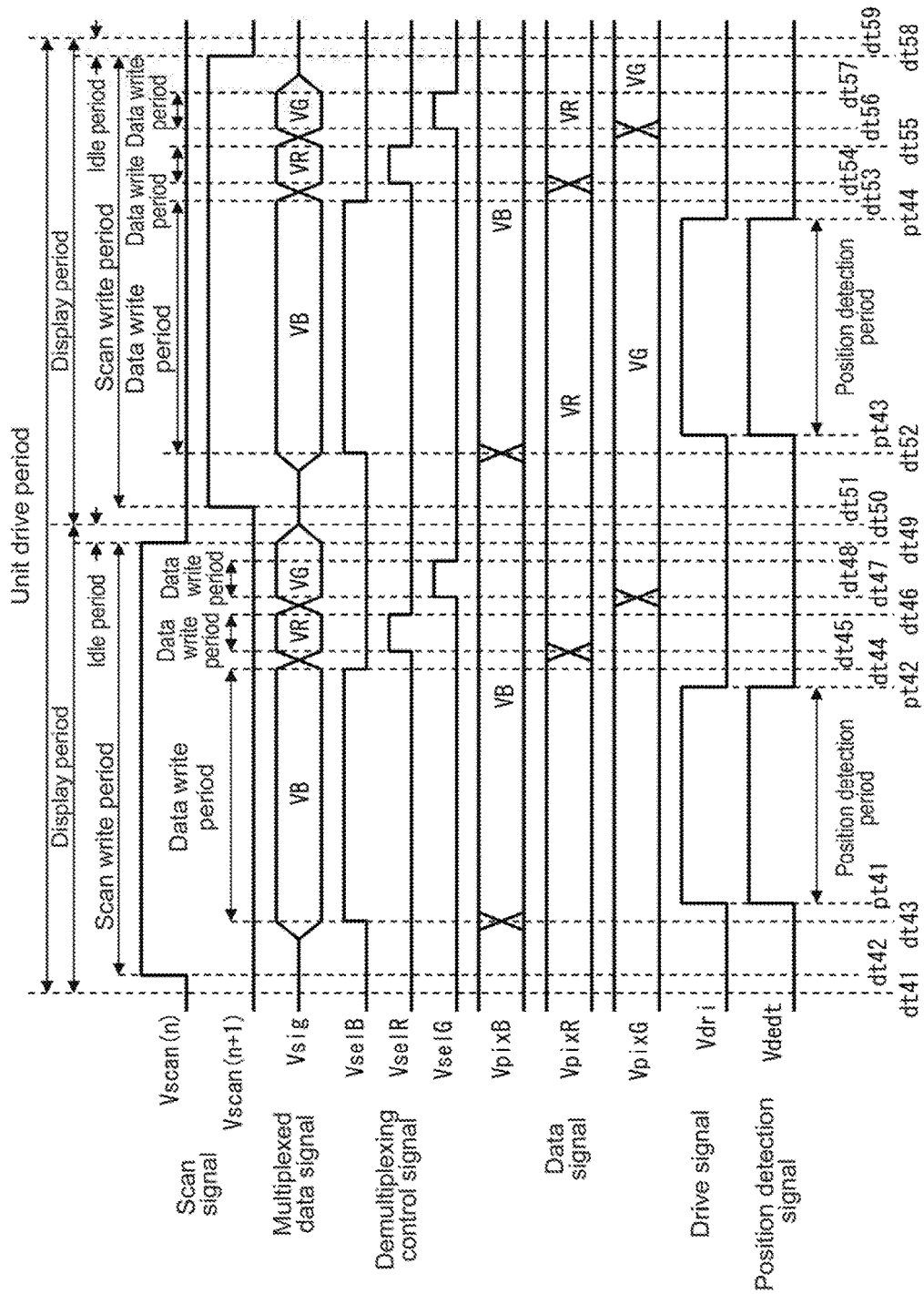
FIG. 12 is a timing chart relating to display and position detection control in a touch panel-equipped display device in modification 2 of the second embodiment.

<Modification 1 of Second Embodiment>
FIG. 12 is a timing chart relating to display and position detection control in a touch panel-equipped display device 10B in modification 1 of the second embodiment. In modification 1 of the second embodiment, the data write of one display pixel is performed in the order of the blue pixel portion PX, the green pixel portion PX, and the red pixel portion PX.

In modification 1, too, the supply of the drive signal Vdri to the drive electrode 39 is started (timing pt41, timing pt43) during the data write of the blue pixel portion PX lowest in luminosity (timing dt43 to timing dt44, timing dt52 to timing dt53). Here, from among the data write periods of the green, blue, and red pixel portions PX constituting one display pixel, the data write period of the blue pixel portion PX (timing dt43 to timing dt44, timing dt52 to timing dt53) is longer than the data write period of the red pixel portion PX (timing dt45 to timing dt46, timing dt54 to timing dt55) and the data write period of the green pixel portion PX (timing dt47 to timing dt48, timing dt56 to timing dt57).

The timing pt42 or pt44 at which the supply of the drive signal Vdri to the drive electrode 39 ends is in the data write period of the blue pixel portion PX (timing dt43 to timing dt44, timing dt52 to timing dt53), as illustrated in FIG. 12.

The touch panel-equipped display device 10B in modification 1 equally starts the supply of the drive signal Vdri to the drive electrode 39 during the data write of the blue pixel portion PX lowest in luminosity. An influence on image display caused by the supply of the drive signal Vdri to the drive electrode 39 can thus be suppressed. Moreover, the data write period of the blue pixel portion PX in which the timing of performing the touch position detection process is included is longer than the data write period of each of the green and red pixel portions PX. In this way, the period during which the voltage level of the source electrode 19b is stable, which temporally overlaps with the touch position detection process period, can be increased. A decrease in accuracy of the touch position detection process due to the data write of the pixel portion PX can thus be prevented.

<Modification 2 of Second Embodiment>

Figure 13:
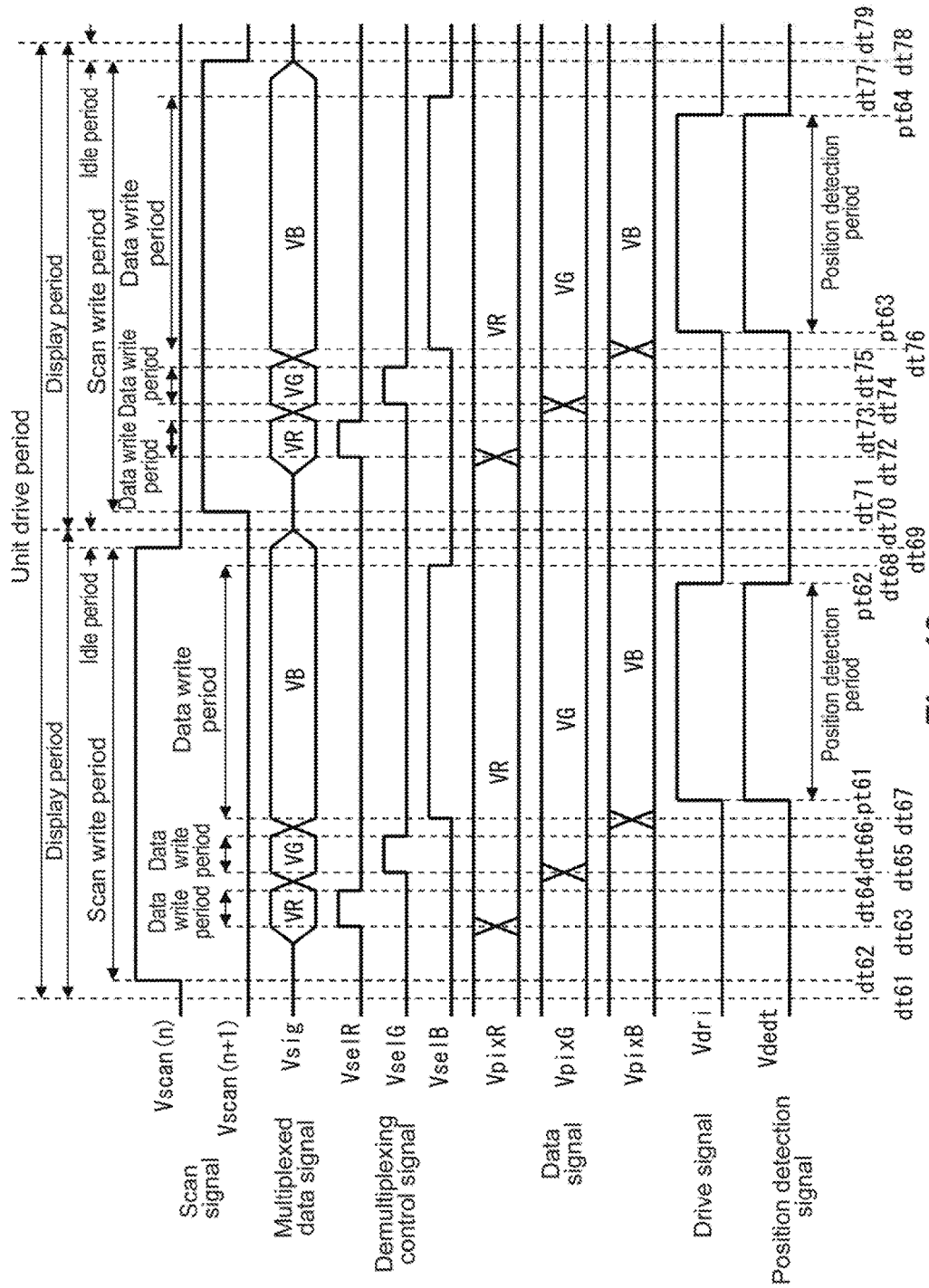
FIG. 13 is a timing chart relating to display and position detection control in a touch panel-equipped display device in modification 3 of the second embodiment.

FIG. 13 is a timing chart relating to display and position detection control in a touch panel-equipped display device 10C in modification 2 of the second embodiment. In modification 2 of the second embodiment, the data write of one display pixel is performed in the order of the red pixel portion PX, the green pixel portion PX, and the blue pixel portion PX.

In modification 2, too, the supply of the drive signal Vdri to the drive electrode 39 is started (timing pt61, timing pt63) during the data write of the blue pixel portion PX lowest in luminosity (timing dt67 to timing dt68, timing dt76 to timing dt77). Here, from among the data write periods of the green, blue, and red pixel portions PX constituting one display pixel, the data write period of the blue pixel portion PX (timing dt67 to timing dt68, timing dt76 to timing dt77) is longer than the data write period of the red pixel portion PX (timing dt63 to timing dt64, timing dt72 to timing dt73) and the data write period of the green pixel portion PX (timing dt65 to timing dt66, timing dt74 to timing dt75).

The timing pt62 or pt64 at which the supply of the drive signal Vdri to the drive electrode 39 ends is in the data write period of the blue pixel portion PX (timing dt67 to timing dt68, timing dt76 to timing dt77), as illustrated in FIG. 13.

The touch panel-equipped display device 10C in modification 2 equally starts the supply of the drive signal Vdri to the drive electrode 39 during the data write of the blue pixel portion PX lowest in luminosity. An influence on image display caused by the supply of the drive signal Vdri to the drive electrode 39 can thus be suppressed. Moreover, the data write period of the blue pixel portion PX in which the timing of performing the touch position detection process is included is longer than the data write period of each of the green and red pixel portions PX. In this way, the period during which the voltage level of the source electrode 19b is stable, which temporally overlaps with the touch position detection process period, can be increased. A decrease in accuracy of the touch position detection process due to the data write of the pixel portion PX can thus be prevented.

[Third Embodiment]

Figure 14:
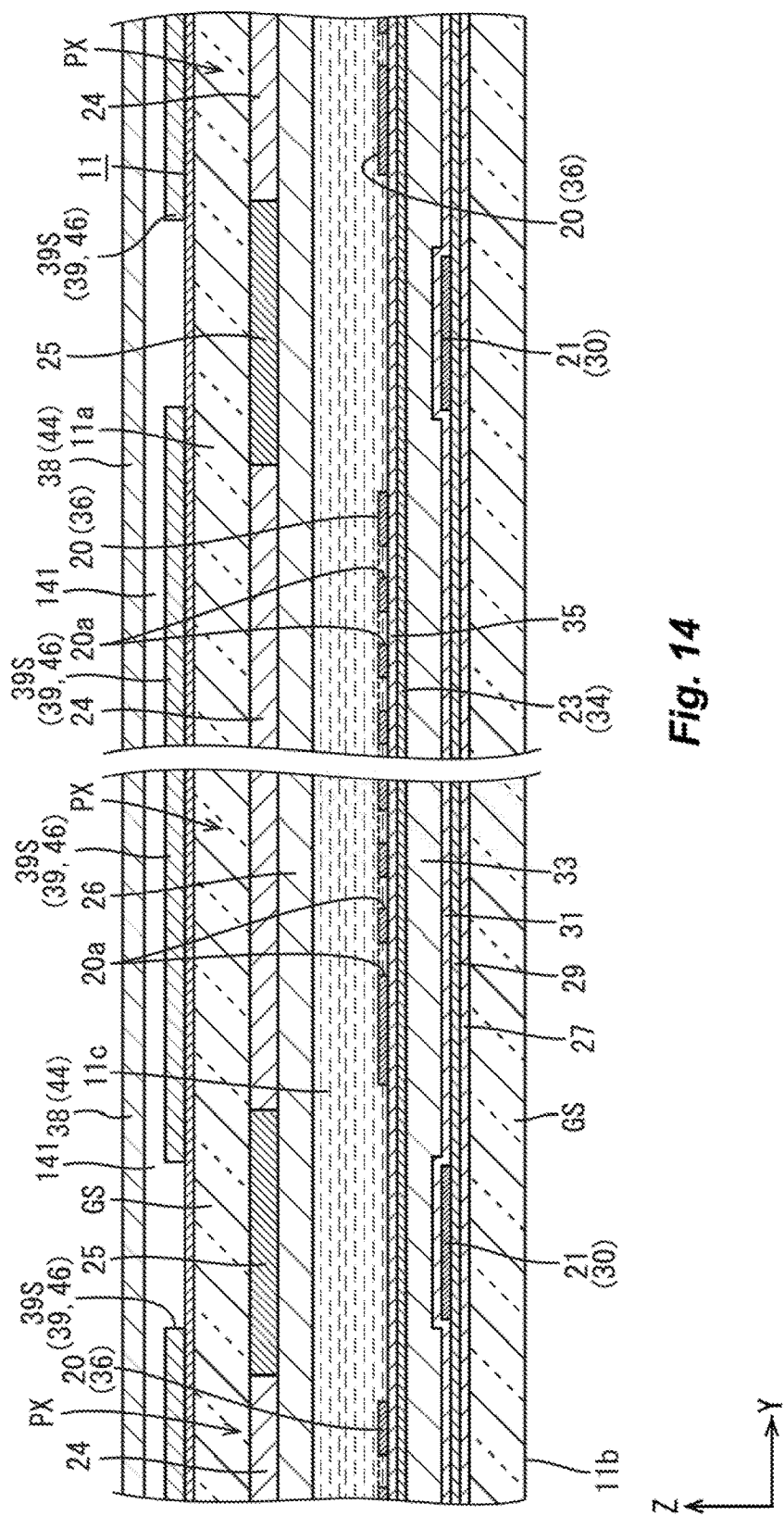
FIG. 14 is a sectional view of the structure of part of a touch panel-equipped display device in a third embodiment.

FIG. 14 is a sectional view of the structure of part of a touch panel-equipped display device 10D in a third embodiment. The drive electrode 39 is located on the surface (display surface) of the CF substrate 11a opposite to the liquid crystal layer 11c, as illustrated in FIG. 14. The detection electrode 38 is located above the drive electrode 39, with an insulation film 141 in between. The detection electrode 38 is bonded to a cover glass (not illustrated) via an adhesive sheet (not illustrated).

The touch panel-equipped display device 10D in the third embodiment is an on-cell type touch panel-equipped display device. The touch panel-equipped display device 10D in the third embodiment differs from the touch panel-equipped display device 10 in the first embodiment only in its structure, and the supply timing of the drive signal Vdri to the drive electrode is the same.

In an on-cell type touch panel-equipped display device, too, when the CF substrate 11a is thinner, the distance between the common electrode 23 and the drive electrode 39 is shorter. Therefore, for example if the drive signal Vdri is supplied to the drive electrode 39 during the data write of the green pixel portion PX which is the color highest in luminosity, a change in luminance level of the green pixel causes an influence (display noise) on image display.

However, the touch panel-equipped display device 10D in this embodiment supplies the drive signal Vdri to the drive electrode 39 in a period that is within the scan write period and is other than the data write period of the green pixel portion PX which is the color highest in luminosity, as in the touch panel-equipped display device 10 in the first embodiment. In particular, the drive signal Vdri is supplied to the drive electrode 39 in a period that is within the scan write period and is between when the data write of the green pixel portion PX highest in luminosity ends and when the data write of the blue pixel portion PX lowest in luminosity starts, as in the first embodiment. An influence on image display caused by the supply of the drive signal Vdri to the drive electrode 39 can therefore be effectively suppressed.

<Modification 1 of Third Embodiment>

Figure 15:
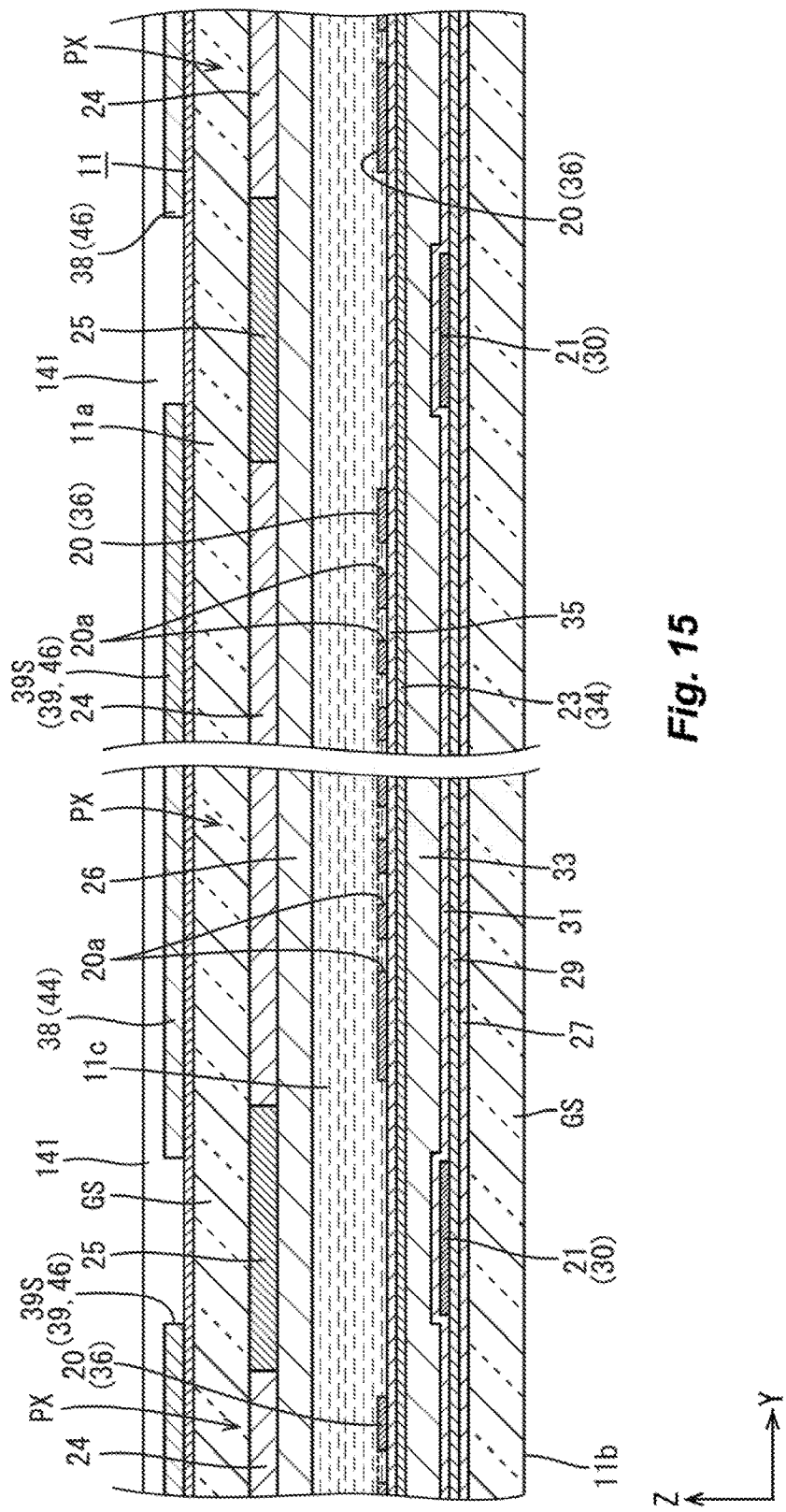
FIG. 15 is a sectional view of the structure of a part of a touch panel-equipped display device in modification 1 of the third embodiment.

FIG. 15 is a sectional view of the structure of part of a touch panel-equipped display device 10E in modification 1 of the third embodiment. The drive electrode 39 and the detection electrode 38 are located on the surface (display surface) of the CF substrate 11a opposite to the liquid crystal layer 11c, as illustrated in FIG. 15. In other words, the drive electrode 39 and the detection electrode 38 are located on the same surface of the CF substrate 11a. The drive electrode 39 and the detection electrode 38 are covered by the insulation film 141. The insulation film 141 is bonded to a cover glass (not illustrated) via an adhesive sheet (not illustrated). The touch panel-equipped display device 10E in the third embodiment is an on-cell type touch panel-equipped display device, too.

Figure 16:
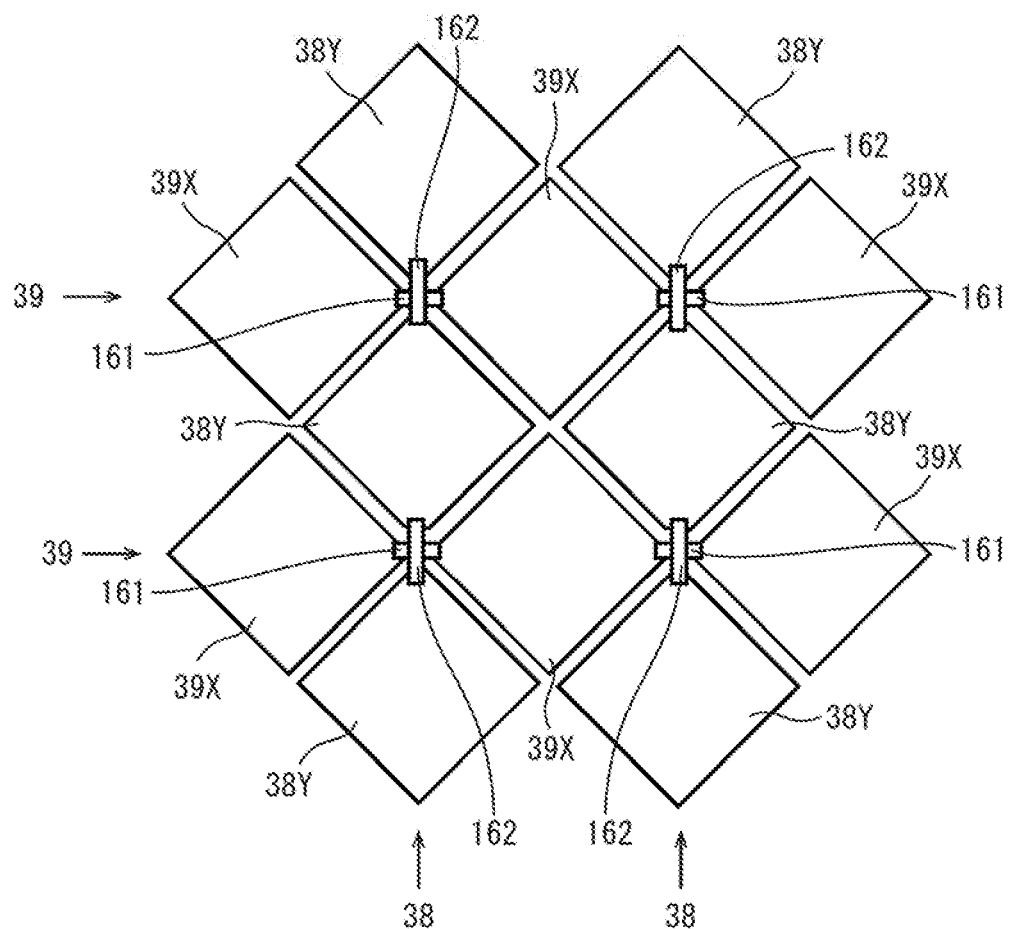
FIG. 16 is a diagram illustrating an example of the arrangement of a drive electrode and a detection electrode in the touch panel-equipped display device in modification 1 of the third embodiment.

FIG. 16 is a plan view illustrating an example of the arrangement of the drive electrode 39 and the detection electrode 38. One drive electrode 39 extending in the X-axis direction is formed by connecting a plurality of diamond-shaped electrodes 39X arranged along the X-axis direction. Diamond-shaped electrodes 39X adjacent in the X-axis direction are connected to each other via a connection electrode 161. One detection electrode 38 extending in the Y-axis direction is formed by connecting a plurality of diamond-shaped electrodes 38Y arranged along the Y-axis direction. Diamond-shaped electrodes 38Y adjacent in the Y-axis direction are connected to each other via a bridge electrode 162 on the insulation film 141.

The touch panel-equipped display device 10E in modification 1 of the third embodiment differs from the touch panel-equipped display device 10D in the third embodiment only in its structure, and the supply timing of the drive signal Vdri to the drive electrode 39 is the same. An influence on image display caused by the supply of the drive signal Vdri to the drive electrode 39 can therefore be effectively suppressed, as in the touch panel-equipped display device 10D in the third embodiment.

<Modification 2 of Third Embodiment>

Figure 17:
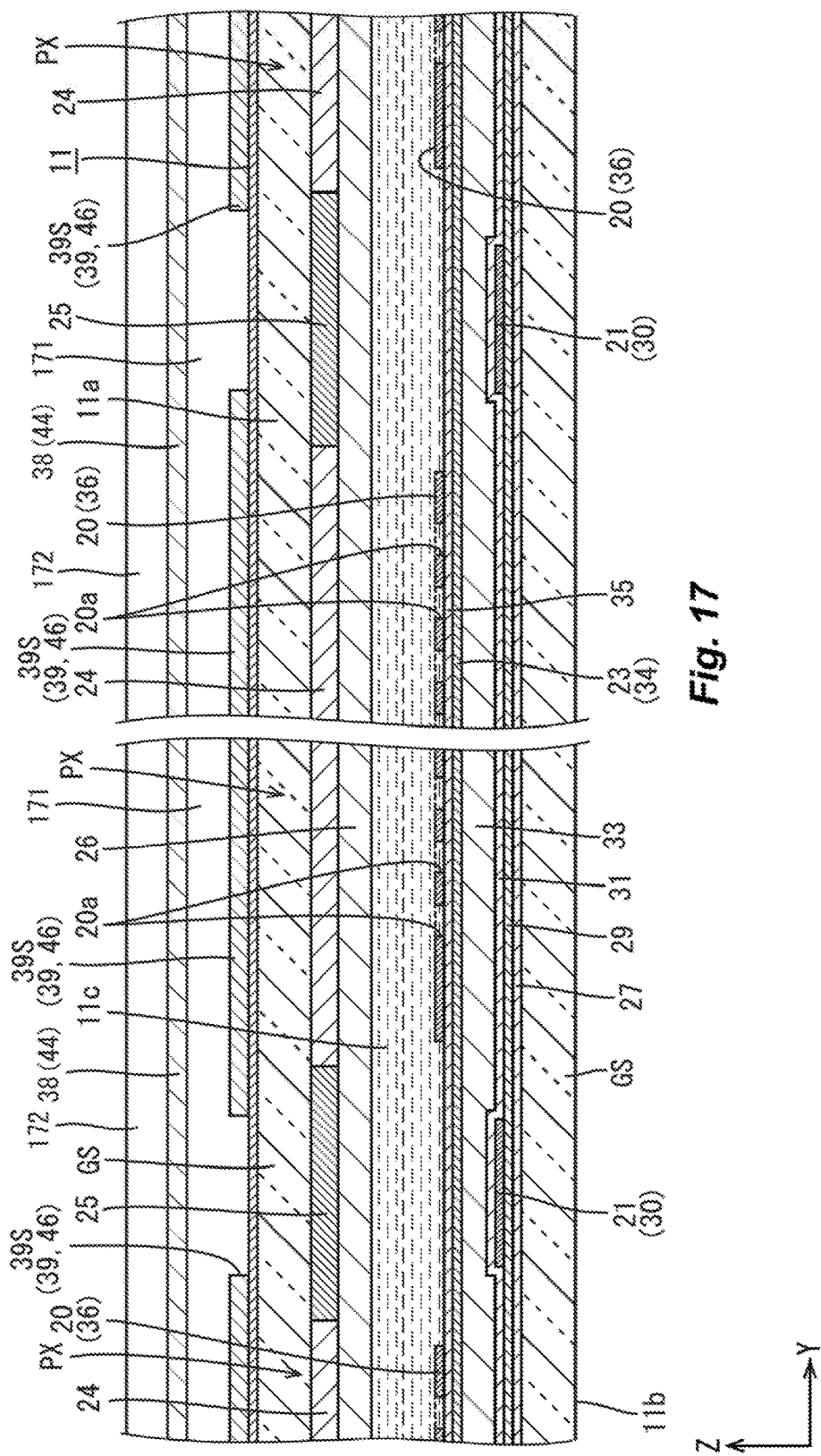
FIG. 17 is a sectional view of the structure of a part of a touch panel-equipped display device in modification 2 of the third embodiment.

FIG. 17 is a sectional view of the structure of part of a touch panel-equipped display device 10F in modification 2 of the third embodiment. The drive electrode 39 is located on the surface (display surface) of the CF substrate 11a opposite to the liquid crystal layer 11c, as illustrated in FIG. 17. The detection electrode 38 is located on the surface of a cover glass 172 facing the CF substrate 11a. An insulating adhesive sheet 171 is provided between the detection electrode 38 and the drive electrode 39. The touch panel-equipped display device 10F is an on-cell type touch panel-equipped display device, too.

The touch panel-equipped display device 10F in modification 2 of the third embodiment differs from the touch panel-equipped display device 10D in the third embodiment only in its structure, and the supply timing of the drive signal Vdri to the drive electrode 39 is the same. An influence on image display caused by the supply of the drive signal Vdri to the drive electrode 39 can therefore be effectively suppressed, as in the touch panel-equipped display device 10D in the third embodiment.

[Fourth Embodiment]

Figure 18:
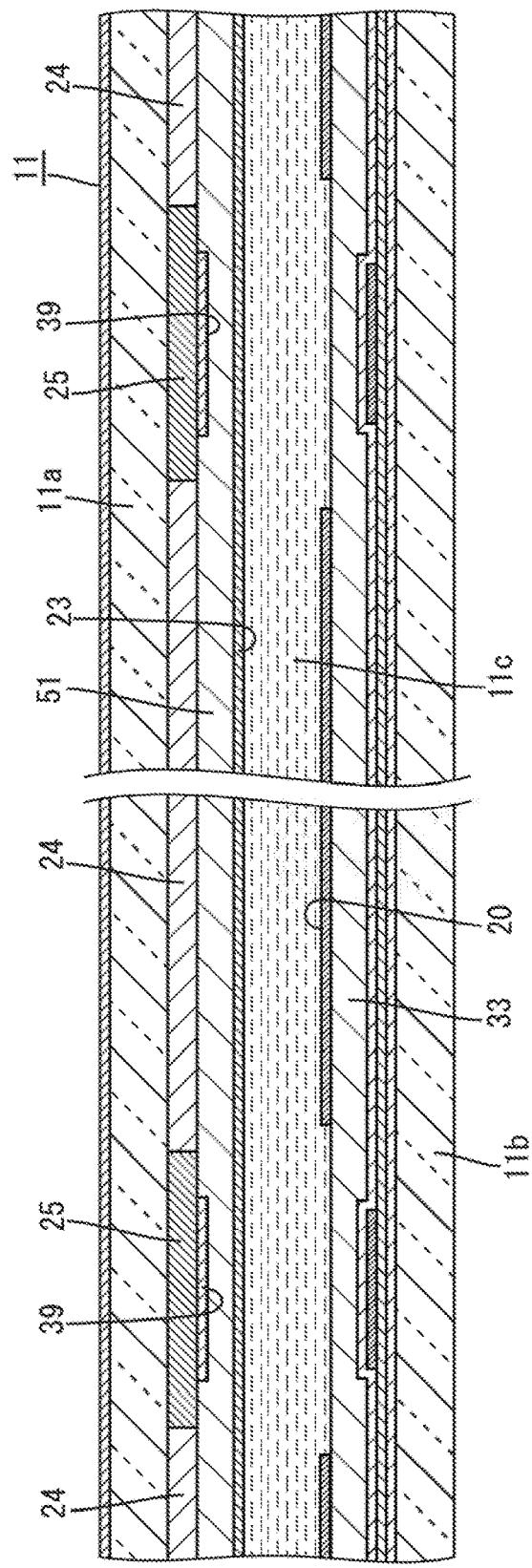
FIG. 18 is a sectional view of the structure of a part of a touch panel-equipped display device in a fourth embodiment.

FIG. 18 is a sectional view of the structure of part of a touch panel-equipped display device 10G in a fourth embodiment. The same structural parts as those in FIG. 6 are given the same reference signs, and their detailed description is omitted.

In the touch panel-equipped display device 10G in the fourth embodiment, the operation mode of the liquid crystal panel 11 is vertical alignment (VA) mode. In other words, the liquid crystal molecules contained in the liquid crystal layer 11c are vertically oriented.

The common electrode 23 is provided not on the active matrix substrate 11b side but on the CF substrate 11a side, as illustrated in FIG. 18. In detail, in the CF substrate 11a, a planarizing film 51 is stacked on the liquid crystal layer 11c side of the color filter 24, light shielding portion 25, and drive electrode 39, and the common electrode 23 is stacked on the liquid crystal layer 11c side of the planarizing film 51. The planarizing film 51 ensures insulation between the drive electrode 39 and the common electrode 23 which are both provided on the inner side of the CF substrate 11a.

The common electrode 23 is a planar member extending over approximately the whole plate plane of the CF substrate 11a. The pixel electrode 20 on the active matrix substrate 11b side does not have the slits 20a (see FIG. 4) described in the first embodiment. Moreover, the second interlayer insulation film 35 (see FIG. 6) described in the first embodiment is not formed in the active matrix substrate 11b, and the pixel electrode 20 is stacked on the planarizing film 33.

The touch panel-equipped display device 10G in the fourth embodiment differs from the touch panel-equipped display device 10 in the first embodiment only in its structure, and the supply timing of the drive signal Vdri to the drive electrode is the same. In detail, the touch panel-equipped display device 10G in this embodiment supplies the drive signal Vdri to the drive electrode 39 in a period that is within the scan write period and is other than the data write period of the green pixel portion PX which is the color highest in luminosity. In particular, the drive signal Vdri is supplied to the drive electrode 39 in a period that is within the scan write period and is between when the data write of the green pixel portion PX highest in luminosity ends and when the data write of the blue pixel portion PX lowest in luminosity starts, as in the first embodiment. An influence on image display caused by the supply of the drive signal Vdri to the drive electrode 39 can therefore be effectively suppressed.

The foregoing embodiments are merely examples that may be used to carry out the present invention. The present invention is not limited to the foregoing embodiments, and can be carried out with appropriate modifications to the foregoing embodiments without departing from the spirit of the present invention.

For example, although the first embodiment describes the case where the drive signal Vdri is supplied to the drive electrode 39 in a period between when the data write of the green pixel portion PX ends and when the data write of the blue pixel portion PX lowest in luminosity starts, the drive signal Vdri may be supplied to the drive electrode 39 during the data write of the blue pixel portion PX lowest in luminosity. In this case, too, the color influenced most by the supply of the drive signal Vdri to the drive electrode 39 can be limited to the color lowest in luminosity. An influence on image display can thus be suppressed.

Although the foregoing embodiments describe several examples of the timing of supplying the drive signal Vdri to the drive electrode 39, the supply timing of the drive signal Vdri is not limited to the foregoing embodiments, as long as the drive signal Vdri is supplied to the drive electrode 39 in a period that is within the scan write period and is other than the data write period of the green pixel portion PX which is the color highest in luminosity. By supplying the drive signal Vdri to the drive electrode 39 in a period other than the data write period of the green pixel portion PX which is the color highest in luminosity, an influence on the display screen caused by supplying the drive signal to the drive electrode 39 can be suppressed.

The third embodiment and its modifications are described as differing from the first embodiment only in the structure and having the same supply timing of the drive signal Vdri to the drive electrode 39. Alternatively, the same control as in the second embodiment may be performed in the touch panel-equipped display device 10D in the third embodiment. In detail, the drive signal Vdri may be supplied to the drive electrode 39 during the data write of the blue pixel portion PX lowest in luminosity and, from among the data write periods of the green, blue, and red pixel portions PX constituting one display pixel, the data write period of the blue pixel portion PX may be longer than the data write period of each of the green and red pixel portions PX.

Although the color filter 24 of the liquid crystal panel has the respective colored portions of red, green, and blue arranged therein, the colors of the colored portions are not limited to red, green, and blue. For example, the colors of the colored portions may be four colors of red, green, blue, and yellow. In the case where the colors of the colored portions are four colors of red, green, blue, and yellow, too, the color highest in luminosity is green and the color lowest in luminosity is blue.

Although the foregoing embodiments describe an example of display control that includes an idle period in a display period, the present invention is also applicable to display control that does not include an idle period in a display period.

Although the foregoing embodiments describe an example of a touch panel-equipped display device including a liquid crystal panel in FFS mode or a liquid crystal panel in VA mode, the present invention is also applicable to a touch panel-equipped display device including a liquid crystal panel in other operation modes such as in-plane switching (IPS) mode.

The present invention is also applicable to a reflective liquid crystal display device that performs display using external light. In such a case, the backlight device may be omitted. The present invention is also applicable to a semi-transmissive liquid crystal display device.

Although the foregoing embodiments describe an example of a liquid crystal panel in which a liquid crystal layer is sandwiched between a pair of substrates, the present invention is also applicable to a display panel in which functional organic molecules other than a liquid crystal material are sandwiched between a pair of substrates.

Although the foregoing embodiments describe an example of a liquid crystal display device using a liquid crystal panel as a display panel, the present invention is also applicable to a display device using other types of display panels (plasma display panel (PDP), organic EL panel, electrophoretic display panel (EPD), etc.). In such a case, the backlight device may be omitted.

REFERENCE SIGNS LIST 10, 10A, 10B, 10C, 10D, 10E, 10F, 10G touch panel-equipped display device
11a CF substrate
11b array substrate
16 driver
19 TFT
20 pixel electrode
23 common electrode
37a column control circuit unit
37b row control circuit unit
38 detection electrode
39 drive electrode
48 touch controller
49 main control unit

The invention claimed is:

1. A touch panel-equipped display device comprising:
a pixel electrode;
a display control element connected to the pixel electrode;
a common electrode that forms a capacitance with the pixel electrode;
a drive electrode;
a detection electrode that forms a capacitance with the drive electrode;
a display control unit configured to supply a scan signal and a data signal to the display control element to perform display control; and
a touch position detection control unit configured to supply a drive signal to the drive electrode, and to detect a position detection signal output from the detection electrode to detect a touch position,
wherein the display control element and the pixel electrode are arranged to correspond to any one of a plurality of colors for performing color display,
the display control unit, when supplying the data signal to the display control element, supplies the data signal sequentially to a plurality of display control elements connected respectively to a plurality of pixel electrodes constituting one display pixel, and
the touch position detection control unit starts the supply of the drive signal to the drive electrode, in a period that is within a scan write period during which the scan signal is supplied to the display control element and is other than a period during which the data signal is supplied to the display control element corresponding to a color highest in luminosity of the plurality of colors.

2. The, touch panel-equipped display device according to claim 1,
wherein the touch position detection control unit starts the supply of the drive signal to the drive electrode, in a period between when the supply of the data signal to the display control element to which the data signal is supplied immediately before the supply of the data signal to the display control element corresponding to a color lowest in luminosity of the plurality of colors ends and when the supply of the data signal to the display control element corresponding to the color lowest in luminosity starts.

3. The touch panel-equipped display device according to claim 2,
wherein the display control element to which the data signal is supplied immediately before the supply of the data signal to the display control element corresponding to the color lowest in luminosity corresponds to the color highest in luminosity.

4. The touch panel-equipped display device according to claim 1,
wherein the touch position detection control unit starts the supply of the drive signal to the drive electrode, in a period during which the data signal is supplied to the display control element corresponding to a color lowest in luminosity of the plurality of colors.

5. The touch panel-equipped display device according to claim 4,
wherein the period during which the data signal is supplied to the display control element corresponding to the color lowest in luminosity is longest of respective periods for supplying the data signal to the plurality of display control elements corresponding to the plurality of colors.

6. The touch panel-equipped display device according to claim 1,
wherein the plurality of colors include red, green, and blue, and
the color highest in luminosity is green.

* * * * *